(12) United States Patent
Santhoff et al.

(10) Patent No.: US 7,486,742 B2
(45) Date of Patent: Feb. 3, 2009

(54) OPTIMIZATION OF ULTRA-WIDEBAND COMMUNICATION THROUGH A WIRE MEDIUM

(75) Inventors: John Santhoff, San Diego, CA (US); Steve Moore, San Diego, CA (US)

(73) Assignee: Pulse-Link, Inc., Carlsbad, CA (US)

( * ) Notice: Subject to any disclaimer, the term of this patent is extended or adjusted under 35 U.S.C. 154(b) by 0 days.

(21) Appl. No.: 11/977,562

(22) Filed: Oct. 25, 2007

(65) Prior Publication Data

US 2008/0063039 A1 Mar. 13, 2008

Related U.S. Application Data

(63) Continuation of application No. 10/772,013, filed on Feb. 3, 2004, now abandoned, which is a continuation-in-part of application No. 10/177,313, filed on Jun. 21, 2002, now abandoned.

(51) Int. Cl.
*H04L 27/00* (2006.01)
(52) U.S. Cl. ...................................................... 375/295
(58) Field of Classification Search ................. 375/130, 375/237, 239, 257, 353, 354, 358, 142, 143, 375/145, 149, 150, 152, 343; 370/280, 503; 455/69, 266, 67.1, 517, 522
See application file for complete search history.

(56) References Cited

U.S. PATENT DOCUMENTS

| | | | |
|---|---|---|---|
| 3,728,632 A | 4/1973 | Ross | |
| 4,641,317 A | 2/1987 | Fullerton | |
| 4,743,906 A | 5/1988 | Fullerton | |
| 4,815,106 A | 3/1989 | Propp | |
| 4,864,589 A | 9/1989 | Endo | |
| 4,979,186 A | 12/1990 | Fullerton | |
| 5,051,720 A | 9/1991 | Kittirutsuneto | |
| 5,278,862 A | 1/1994 | Vander Mey | |
| 5,363,108 A | 11/1994 | Fullerton | |

(Continued)

FOREIGN PATENT DOCUMENTS

EP 1414241 4/2004

(Continued)

OTHER PUBLICATIONS

Powerline Communications, "Powerline Coexistence", White paper, Mar. 2001, 12 pages.

(Continued)

*Primary Examiner*—Sam K Ahn

(57) ABSTRACT

Apparatus and methods to optimize ultra-wideband communication through wire and cable media are provided. One apparatus comprises an ultra-wideband transmitter structured to transmit a training set of ultra-wideband pulses through the wire medium. An ultra-wideband receiver is structured to receive the training set of ultra-wideband pulses from the wire medium. A determination of which of the pulses within the training set is best suited for communication through the media is then performed. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

18 Claims, 11 Drawing Sheets

U.S. PATENT DOCUMENTS

| | | |
|---|---|---|
| 5,485,040 A | 1/1996 | Sutterlin |
| 5,491,463 A | 2/1996 | Sargeant |
| 5,523,760 A | 6/1996 | McEwan |
| 5,554,968 A | 9/1996 | Lee |
| 5,677,927 A | 10/1997 | Fullerton |
| 5,687,169 A | 11/1997 | Fullerton |
| 5,729,607 A | 3/1998 | DeFnes et al. |
| 5,745,837 A | 4/1998 | Fuhrmann |
| 5,774,526 A | 6/1998 | Propp et al. |
| 5,822,678 A | 10/1998 | Evanyk |
| 5,828,946 A | 10/1998 | Feisullin et al. |
| 5,832,035 A | 11/1998 | Fullerton |
| 5,835,054 A | 11/1998 | Warhus et al. |
| 5,864,284 A | 1/1999 | Sanderson |
| 5,896,556 A | 4/1999 | Moreland et al. |
| 5,937,342 A | 8/1999 | Kline |
| 5,940,387 A | 8/1999 | Humpleman |
| 5,944,842 A | 8/1999 | Propp et al. |
| 5,960,031 A | 9/1999 | Fullerton et al. |
| 5,963,581 A | 10/1999 | Fullerton et al. |
| 5,982,276 A | 11/1999 | Stewart |
| 5,995,534 A | 11/1999 | Fullerton et al. |
| 6,031,862 A | 2/2000 | Fullerton et al. |
| 6,040,759 A | 3/2000 | Sanderson |
| 6,140,911 A | 10/2000 | Fischer et al. |
| 6,178,217 B1 | 1/2001 | DeFnes et al. |
| 6,218,979 B1 | 4/2001 | Barnes et al. |
| 6,275,045 B1 | 8/2001 | Eloy |
| 6,281,784 B1 | 8/2001 | Redgate et al. |
| 6,360,075 B1 | 3/2002 | Fischer et al. |
| 6,373,377 B1 | 4/2002 | Sacca et al. |
| 6,384,773 B1 | 5/2002 | Martin et al. |
| 6,430,208 B1 | 8/2002 | Fullerton et al. |
| 6,437,832 B1 | 8/2002 | Grabb et al. |
| 6,441,695 B1 | 8/2002 | Flake |
| 6,492,897 B1 | 12/2002 | Mowery, Jr. |
| 6,492,904 B2 | 12/2002 | Richards |
| 6,496,104 B2 | 12/2002 | Kline |
| 6,497,656 B1 | 12/2002 | Evans |
| 6,512,474 B2 | 1/2003 | Pergande |
| 6,515,622 B1 | 2/2003 | Izadpanah et al. |
| 6,529,166 B2 | 3/2003 | Kanamaloru |
| 6,539,068 B2 | 3/2003 | Hebron et al. |
| 6,549,567 B1 | 4/2003 | Fullerton |
| 6,571,089 B1 | 5/2003 | Richards et al. |
| 6,586,999 B2 | 7/2003 | Richley |
| 6,611,223 B2 | 8/2003 | Low et al. |
| 6,637,033 B1 | 10/2003 | Cloonan et al. |
| 6,678,321 B1 | 1/2004 | Graham et al. |
| 6,690,247 B2 | 2/2004 | Kinitis et al. |
| 6,721,298 B1 | 4/2004 | Vella-Coleiro |
| 6,782,048 B2 | 8/2004 | Santhoff |
| 6,847,267 B2 | 1/2005 | Flake et al. |
| 6,865,256 B1 | 3/2005 | Descamps et al. |
| 6,909,877 B2 | 6/2005 | Rifheart et al. |
| 6,968,130 B1 | 11/2005 | Pan |
| 7,013,145 B1 | 3/2006 | Centore, III |
| 7,092,693 B2 | 8/2006 | Boyden et al. |
| 7,167,525 B2 | 1/2007 | Santhoff et al. |
| 2001/0011930 A1 | 8/2001 | Kintis et al. |
| 2001/0054953 A1 | 12/2001 | Kline |
| 2002/0024423 A1 | 2/2002 | Kline |
| 2002/0075972 A1 | 6/2002 | Richards et al. |
| 2002/0076193 A1 | 6/2002 | Melick et al. |
| 2002/0097821 A1 | 7/2002 | Hebron et al. |
| 2002/0191690 A1 | 12/2002 | Pendergrass et al. |
| 2003/0031191 A1 | 2/2003 | El Wardani et al. |
| 2003/0129978 A1 | 7/2003 | Akiyama et al. |
| 2003/0202537 A1 | 10/2003 | Rogerson et al. |
| 2003/0228005 A1 | 12/2003 | Melick et al. |
| 2004/0125859 A1 | 7/2004 | Green et al. |
| 2004/0136438 A1 | 7/2004 | Fullerton et al. |
| 2004/0142663 A1 | 7/2004 | Roberts |
| 2004/0174924 A1 | 9/2004 | Lakkis et al. |
| 2004/0198260 A1 | 10/2004 | Molisch et al. |
| 2004/0233972 A1 | 11/2004 | Karaoguz |
| 2004/0233973 A1 | 11/2004 | Fullerton et al. |
| 2005/0047379 A1 | 3/2005 | Boyden et al. |
| 2005/0069052 A1 | 3/2005 | Carbonari |
| 2005/0131922 A1 | 6/2005 | Kennedy et al. |

FOREIGN PATENT DOCUMENTS

| | | |
|---|---|---|
| WO | WO 96/09694 | 3/1996 |
| WO | WO 02/31986 | 4/2002 |
| WO | WO 02/49245 | 6/2002 |

OTHER PUBLICATIONS

Dan Raphaeli & Evgeni Bassin, "A Comparison between OFDM, Single Carrier, and Spread Spectrum for High Data Rate PLC", Apr. 1999, White paper, 6 pages.

Matthew Welborn, "An M-ary Bi-Orthogonal Ultrawideband Communications System", U.S. Appl. No. 60/357,638, Feb. 20, 2002, pp. 1-40.

Go Hara, Yoshihiro Hase, Shingo Oomori, Fujinobu Takahashi & Ryuji Kohno, "Foundation Study on the Application of UWB Impulse Radio to ROF", 2002 Society of Electronics, Information and Communication Engineers Genereal Conference, Mar. 27-30, 2002, 2 pages.

Win Moe Z et al., "Ultra-Wide Bandwidth Time-Hopping Spread-Spectrum Impulse Radio for Wireless Multiple-Access Communications", Apr. 2000.

Stephen Grossman, Existing In-Home Coax Can Support Data Comm, Electronic Design, Mar. 5, 2001, 3 pgs.

Ken Davidson, CEBus Goes Coax, The Computer Applications Journal, Feb./Mar. 1992, 3 pgs, Issue 25.

Julie Jacobson, Coax Gaining Favor for In-Home Networks, Home Networking News, Jun. 2002, 5 pgs.

Business Wire, Entropic to Detail 270Mbps Home Networking Over COax at Communications Design Conference Wednesday, Mar. 31, Mar. 30, 2004, 2 pgs.

Julie Jacobson, Coax Gets Consortium of its Own, Home Networking News, May 2001, 2 pgs.

Noam Geri, Hybrid Coax-Wireless Multimedia Home Networks Using 802.11 Technology, Texas Instruments White Paper, Mar. 2003, 7 pgs.

PRNewswire, True Plug & Play Home Multimedia Network Debuts at NCTA, Silicon Strategies, May 4, 2004, 3 pgs.

Yue Guang-Rong & Ge L I-Jia, "Summaries of Ultra-Widebandwidth Radio", Journal of PLA University of Science and Technology, vol. 3, No. 2, Apr. 2002, 6 pages.

China Academic Journal Electronic Publishing House, CATV and Network, 2001, 3 pages.

"Cramer, J.M.; et al., ""On the analysis of UWB communication channels""", Military Communications Conference Proceedings, 1999. MILCOM 1999. IEEE vol. 2, Oct. 31-Nov. 3, 1999, pp. 1191-1195 vol. 2".

Schutt-Aine, J.E., "High-frequency characterization of twisted-pair cables", Communications, IEEE Transactions on vol. 49, Issue 4, Apr. 2001 pp. 598-601.

"Kavehrad, M., et al. ""10 Gbps transmission over standard category-5 copper cable""", Global Telecommunications Conference, 2003. GLOBECOM 03. IEEE vol. 7, Dec. 1-5, 2003 pp. 4106-4110 vol. 7".

Win, M.Z.; Scholtz, R.A., "Impulse radio: how it works", Communications Letters, IEEE, vol. 2, Issue 2, Feb. 1998 pp. 36-38.

Siwiak K. et al., "Ultra-wide band radio: the emergence of an important new technology", Vehicular Technology Conference, 2001. VTC 2001 Spring. IEEE VTS 53rd, vol. 2, May 6-9, 2001 pp. 1169-1172 vol. 2.

Engler, H.F. Jr., "Advanced technologies for ultra wideband system design", Electromagnetic Compatibility, 1993. Symposium Record. 1993 IEEE International Symposium on Aug. 9-13, 1993 pp. 250-253 vol. 2.

Siwiak, "Ultra-wide band radio: introducing a new technology", Vehicular Technology Conference, 2001. VTC 2001 Spring. IEEE VTS 53rd vol. 2, May 6-9, 2001 pp. 1088-1093 vol. 2.

Mitchell, Broad is the way [ultra-wideband technology]; IEEE Review vol. 47, Issue 1, Jan. 2001 pp. 35-39.

Bruno Pattan, "A Brief Exposure to Ultra-Wideband Signaling", Microwave Journal, Dec. 2003, 5 pages.

David Leeper, "Wireless Data Blaster", Scientific American, May 2002, pp. 64-69.

OPTIMIZATION OF ULTRA-WIDEBAND COMMUNICATION THROUGH A WIRE MEDIUM

This application claims priority under 35 U.S.C. § 120 as a continuation of U.S. non-provisional application Ser. No. 10/772,013, filed Feb. 3, 2004, now abandoned entitled "OPTIMIZATION OF ULTRA-WIDEBAND COMMUNICATION THROUGH A WIRE MEDIUM," which is a continuation-in-part of U.S. non-provisional application Ser. No. 10/177,313, filed Jun. 21, 2002, now abandoned entitled "ULTRA-WIDEBAND COMMUNICATION THROUGH A WIRED MEDIUM," now abandoned.

FIELD OF THE INVENTION

The present invention generally relates to ultra-wideband communications. More particularly, the invention concerns methods of optimizing the transmission of ultra-wideband pulses, or signals through wire media.

BACKGROUND OF THE INVENTION

The Information Age is upon us. Access to vast quantities of information through a variety of different communication systems are changing the way people work, entertain themselves, and communicate with each other. For example, as a result of increased telecommunications competition mapped out by Congress in the 1996 Telecommunications Reform Act, traditional cable television program providers have evolved into full-service providers of advanced video, voice and data services for homes and businesses. A number of competing cable companies now offer cable systems that deliver all of the just-described services via a single broadband network.

These services have increased the need for bandwidth, which is the amount of data transmitted or received per unit time. More bandwidth has become increasingly important, as the size of data transmissions has continually grown. Applications such as in-home movies-on-demand and video teleconferencing demand high data transmission rates. Another example is interactive video in homes and offices.

Other industries are also placing bandwidth demands on Internet service providers, and other data providers. For example, hospitals transmit images of X-rays and CAT scans to remotely located physicians. Such transmissions require significant bandwidth to transmit the large data files in a reasonable amount of time. These large data files, as well as the large data files that provide real-time home video are simply too large to be feasibly transmitted without an increase in system bandwidth. The need for more bandwidth is evidenced by user complaints of slow Internet access and dropped data links that are symptomatic of network overload.

Internet service providers, cable television networks and other data providers generally employ conductive wires and cables to transmit and receive data. Conventional approaches to signal (i.e. data) transmission through a transmission medium, such as a wire or cable, is to modulate the signal though the medium at a frequency that lies within the bounds at which the medium can electrically conduct the signal. Because of this conventional approach, the bandwidth of a specific medium is limited to a spectrum within which the medium is able to electrically transmit the signal via modulation, which yields a current flow. As a result, many costly and complicated schemes have been developed to increase the bandwidth in conventional conductive wire and/or cable systems using sophisticated switching schemes or signal time-sharing arrangements. Each of these methods is rendered costly and complex in part because the data transmission systems adhere to the conventional acceptance that the bandwidth of a wire or cable is constrained by its conductive properties.

Therefore, there exists a need for a method to increase the bandwidth of conventional wired networks.

SUMMARY OF THE INVENTION

The present invention provides methods to transmit ultra-wideband (UWB) pulses, or signals through any wire media, whether the media is twisted-pair wire, coaxial cable, fiber optic cable, or other types of wire media.

In one embodiment of the present invention, an UWB device sends at least one UWB pulse to another UWB device through a wire media. The receiving device evaluates the UWB pulse. The receiving device then responds to the transmitting device with a message containing information relating to the received UWB pulse. Upon receipt of the response message the transmitting device may adjust subsequent UWB pulses in response to the received information.

In one embodiment, UWB transmissions through the wire media may be the sole transmissions on the medium. Alternatively, the UWB transmissions may simultaneously coexist with other communication transmissions on the same wire media.

These and other features and advantages of the present invention will be appreciated from review of the following detailed description of the invention, along with the accompanying figures in which like reference numerals refer to like parts throughout.

Figure 1:
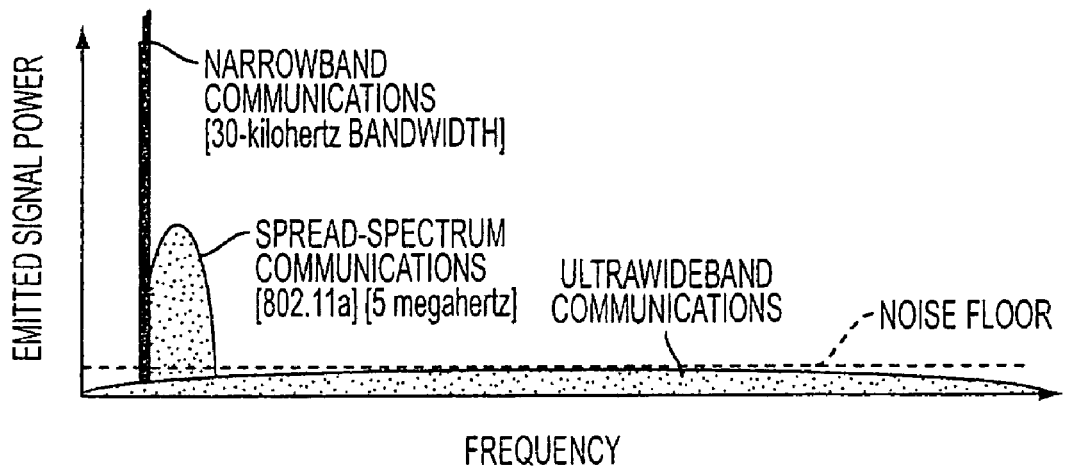
FIG. 1 is an illustration of different communication methods.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Generally, a traditional cable television provider, a community antenna television provider, a community access television provider, a cable television provider, a hybrid fiber-coax television provider, an Internet service provider, or any other provider of television, audio, voice and/or Internet data receives broadcast signals at a central station, either from terrestrial cables, and/or from one or more antennas that receive signals from a communications satellite. The broadcast signals are then distributed, usually by coaxial and/or fiber optic cable, from the central station to nodes located in business or residential areas.

For example, community access television provider (CATV) networks are currently deployed in several different topologies and configurations. The most common configurations found today are analog signals transmitted over coaxial cable and Hybrid Fiber-Coax Systems (HFCS) that employ both fiber optic and coaxial cables. The analog coax systems are typically characterized as pure analog systems. Pure analog CATV systems are characterized by their use of established NTSC/PAL (National Television Standards Committee/Phase Alternation Line) modulation onto a frequency carrier at 6 or 8 MHz intervals.

HFCS is a combination analog—digital topology employing both coaxial (analog) and fiber optic (digital) media that typically supports digitally modulated/encoded television channels above channel 78. According to ANSI/EIA-542-1997, in the United States, the analog channels are modulated in 6 MHz allocations on channels 2 to 78 using frequencies from 55 to 547 MHz. When using HFCS, digital channels typically start at channel 79 and go as high as 136 and occupy a frequency range from 553 to 865 MHz. In some extended HFCS systems, channel assignments can go as high as channel 158 or 997 MHz. The current ANSI/EIA-542-1997 standard only defines and assigns channels to these limits. The actual wire/cable media itself is generally capable of transmitting frequencies up to 3 GHz.

In both CATV and HFCS systems, typically the satellite downlink enters the cable company's head-end and the video, and/or other data streams are de-multiplexed out. Individual video data streams (either NTSC, MPEG, or any other suitable protocol) are extracted from the satellite downlink stream and routed to modulators specific for individual television channels. The outputs from each modulator are then combined into one broadband signal. From this point the combined channels are amplified and sent out, either by coaxial or fiber optic cable, to the customers.

In a HFCS, before the combined broadband signal leaves the head-end the broadband signal is modulated onto a fiber optic cable for distribution into the field, such as residential neighborhoods, or business districts. Modulation of the broadband signal is typically accomplished in one of two ways. In the first method the entire broadband signal is sampled and digitized using a high speed Analog to Digital Converter (ADC). To perform reliable digital sampling, the data must be sampled at a rate at least twice the highest frequency component to meet Nyquist minimum sampling requirements. To provide a higher quality data stream, the signal should be sampled at 2.5 to 4 times the highest frequency, which entails sample rates of approximately 2 to 4 GHz. A parallel to serial converter then shifts the parallel output data of the ADC into a serial format. The serial data then drives a laser diode for transmission over the fiber optic cable. The second method is broadband block conversion where the entire spectrum of the broadband signal is modulated onto the fiber optic cable.

Designated access nodes are located in neighborhoods, business districts and other areas. The access nodes contain a high speed Digital to Analog Converter (DAC) and a de-serializer. A fiber optic receiver detects the laser-modulated signal at the access node. A parallel to serial converter de-serializes the data and it is feed to the high speed DAC. The data then leaves the access node on standard 75 ohm, RG-6 or RG-8 or other suitable coax cable and is distributed to the customer's premises. Thus, at the access node, the broadband signal is extracted from the fiber optic cable and transferred to a coaxial cable that connects to individual homes, apartments, businesses, universities, and other customers. Support of multiple customers is generally accomplished by the use of distribution boxes in the field, for example, on telephone poles or at ground level. However, as the signal is continuously split at the distribution boxes, the received bandwidth is reduced and the quality of the signal is diminished, thereby diminishing the video, audio, and other data quality.

The digital channels that generally reside on CATV channels 79 and higher are fundamentally different than the analog channels that generally reside on channels 2 through 78. The analog channels are comprised of modulated frequency carriers. The digital channels, which generally use the 6 MHz allocation system, are digitally modulated using Quadrature Amplitude Modulation (QAM). QAM is a method of combining two amplitude modulated signals into a single channel, thereby doubling the effective bandwidth. In a QAM signal, there are two carriers, each having the same frequency but differing in phase by 90 degrees. The two modulated carriers are combined for transmission, and separated after transmission. QAM 16 transmits 16 bits per signal, QAM 32, 64, and 256 each transmit 32, 54 and 256 bits per signal, respectively. QAM was developed to support additional video streams encoded with MPEG video compression. Conventional CATV and HFCS networks may employ QAM levels up to QAM 64 to enable up to 8 independent, substantially simultaneous MPEG video streams to be transmitted.

At the customer's location, the coaxial cable is connected to either a set-top box or directly to a television. The receiving device then de-multiplexes and de-modulates the video, audio, voice, Internet or other data. Although a television can directly receive the analog signal, a set-top box is generally required for reception of the digitally encoded channels residing on CATV channels 79 and higher.

The above-described networks, and other networks and communication systems that employ wired media, such as twisted-pair or coaxial cable, suffer from performance limitations caused by signal interference, ambient noise, and spurious noise. In these conventional wired media systems, these limitations affect the available system bandwidth, distance, and carrying capacity of the system, because the noise floor and signal interference in the wired media rapidly overcome the signal transmitted. Therefore, noise within the wired media significantly limits the available bandwidth of any wired system or network.

Generally, the conventional wisdom for overcoming this limitation is to boost the power (i.e., increase the voltage of the signal) at the transmitter to boost the voltage level of the signal relative to the noise at the receiver. Without boosting the power at the transmitter, the receiver is unable to separate the noise from the desired signal. Thus, the overall performance of wired media systems is still significantly limited by the accompanying noise that is inherent in wired media.

Increasing the available bandwidth of an established wired media network, while coexisting with the conventional data signals transmitted through the network, represents an opportunity to leverage the existing wired media network infrastructure to enable the delivery of greater functionality. Several methods and techniques have been proposed, but they are generally computationally intense, hence costly.

The present invention may be employed in any type of network that uses wired media, in whole, or in part. That is, a network may use both wired media, such as coaxial cable, and wireless devices, such as satellites. As defined herein, a network is a group of points or nodes connected by communication paths. The communication paths may be connected by wires, or they may be wirelessly connected. A network as defined herein can interconnect with other networks and contain subnetworks. A network as defined herein can be characterized in terms of a spatial distance, for example, such as a local area network (LAN), a metropolitan area network (MAN), and a wide area network (WAN), among others. A network as defined herein can also be characterized by the type of data transmission technology in use on it, for example, a TCP/IP network, and a Systems Network Architecture network, among others. A network as defined herein can also be characterized by whether it carries voice, data, or both kinds of signals. A network as defined herein can also be characterized by who can use the network, for example, a public switched telephone network (PSTN), other types of public networks, and a private network (such as within a single room or home), among others. A network as defined herein can also be characterized by the usual nature of its connections, for example, a dial-up network, a switched network, a dedicated network, and a nonswitched network, among others. A network as defined herein can also be characterized by the types of physical links that it employs, for example, optical fiber, coaxial cable, a mix of both, unshielded twisted pair, and shielded twisted pair, among others.

The present invention employs a "carrier free" architecture which does not require the use of high frequency carrier generation hardware, carrier modulation hardware, stabilizers, frequency and phase discrimination hardware or other devices employed in conventional frequency domain communication systems. The present invention dramatically increases the bandwidth of conventional networks that employ wired media, but can be inexpensively deployed without extensive modification to the existing wired media network.

The present invention provides increased bandwidth by injecting, or otherwise super-imposing an ultra-wideband (UWB) signal into the existing data signal and subsequently recovers the UWB signal at an end node, set-top box, subscriber gateway, or other suitable location. Ultra-wideband, or impulse radio, employs pulses of electromagnetic energy that are emitted at nanosecond or picosecond intervals (generally tens of picoseconds to a few nanoseconds in duration). For this reason, ultra-wideband is often called "impulse radio." Because the excitation pulse is not a modulated waveform, UWB has also been termed "carrier-free" in that no apparent carrier frequency is evident in the radio frequency (RF) spectrum. That is, the UWB pulses are transmitted without modulation onto a sine wave carrier frequency, in contrast with conventional radio frequency technology. Ultra-wideband requires neither an assigned frequency nor a power amplifier.

Conventional radio frequency technology employs continuous sine waves that are transmitted with data embedded in the modulation of the sine waves' amplitude or frequency. For example, a conventional cellular phone must operate at a particular frequency band of a particular width in the total frequency spectrum. Specifically, in the United States, the Federal Communications Commission has allocated cellular phone communications in the 800 to 900 MHz band. Cellular phone operators use 25 MHz of the allocated band to transmit cellular phone signals, and another 25 MHz of the allocated band to receive cellular phone signals.

Another example of a conventional radio frequency technology is illustrated in FIG. 1. 802.11a, a wireless local area network (LAN) protocol, transmits radio frequency signals at a 5 GHz center frequency, with a radio frequency spread of about 5 MHz.

Figure 2:
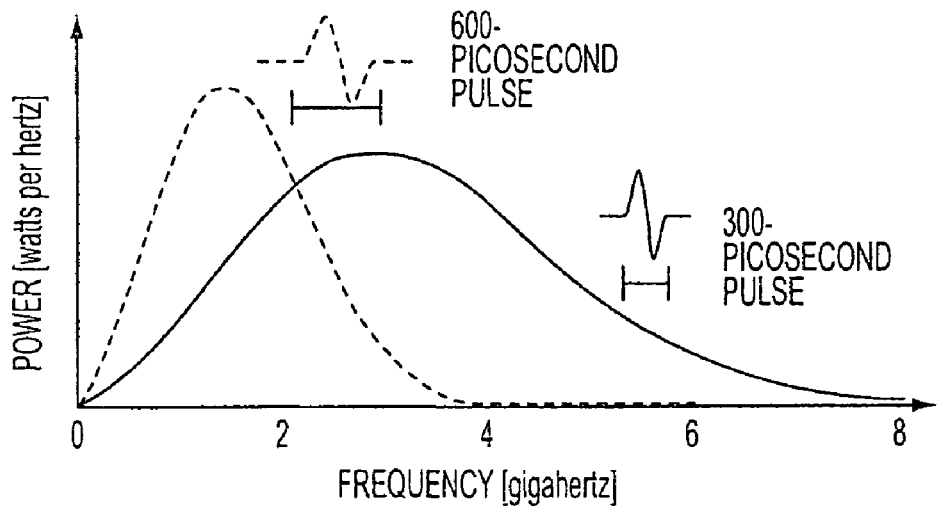
FIG. 2 is an illustration of two ultra-wideband pulses.

In contrast, a UWB pulse may have a 1.8 GHz center frequency, with a frequency spread of approximately 4 GHz, as shown in FIG. 2, which illustrates two typical UWB pulses. FIG. 2 illustrates that the narrower the UWB pulse in time, the higher its center frequency and the broader the spread of its frequency spectrum. This is because frequency is inversely proportional to the time duration of the pulse. A 600 picosecond UWB pulse will have about a 1.8 GHz center frequency, with a frequency spread of approximately 4 GHz. And a 300 picosecond UWB pulse will have about a 3 GHz center frequency, with a frequency spread of approximately 8 GHz. Thus, UWB pulses generally do not operate within a specific frequency, as shown in FIG. 1. And because UWB pulses are spread across an extremely wide frequency range, UWB communication systems allow communications at very high data rates, such as 100 megabits per second or greater.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by this reference.

Also, because the UWB pulse is spread across an extremely wide frequency range, the power sampled at a single, or specific frequency is very low. For example, a UWB one-watt signal of one nano-second duration spreads the one-watt over the entire frequency occupied by the pulse. At any single frequency, such as at the carrier frequency of a CATV provider, the UWB pulse power present is one nano-watt (for a frequency band of 1 GHz). This is well within the noise floor of any wired media system and therefore does not interfere with the demodulation and recovery of the original CATV signals. Generally, the multiplicity of UWB pulses are transmitted at relatively low power (when sampled at a single, or specific frequency), for example, at less than –30 power decibels to –60 power decibels, which minimizes interference with conventional radio frequencies. However, UWB pulses transmitted through most wired media will not interfere with wireless radio frequency transmissions. Therefore, the power (sampled at a single frequency) of UWB pulses transmitted though wired media may range from about +30 dB to about –90 dB.

For example, a CATV system generally employs a coaxial cable that transmits analog data on a frequency carrier. Generally, amplitude modulation (AM) or QAM (discussed above) are used to transmit the analog data. Since data transmission employs either AM or QAM, UWB signals can coexist in this environment without interference. In AM, the data signal M(t) is multiplied with a cosine at the carrier frequency. The resultant signal y(t) can be represented by:

$$y(t)=m(t)\cos(\omega_c t)$$

In a QAM based system multiple carrier signals are transmitted at the same carrier frequency, but at different phases. This allows multiple data signals to be simultaneously carried. In the case of two carriers, an "in phase" and "quadrature" carriers can carry data signals Mc(t) and Ms(t). The resultant signal y(t) can be represented as:

$$y(t)=Mc(t)\cos(\omega_c t)+Ms(t)\sin(\omega_c t)$$

However, as discussed above, an UWB system transmits a narrow time domain pulse, and the signal power is generally evenly spread over the entire bandwidth occupied by the signal. At any instantaneous frequency, such as at the AM or QAM carrier frequency, the UWB pulse power present is one nano-watt (for a frequency band of 1 GHz). This is well within the noise floor of any wired media system and therefore does not interfere with the demodulation and recovery of the original AM or QAM data signals.

Wired media communication systems suffer from performance limitations caused by signal interference, ambient noise, and spurious noise. These limitations affect the available bandwidth, distance, and carrying capacity of the wire media system. With wired communication systems, the noise floor and signal interference in the wired media rapidly overcome the transmitted carrier signal. This noise on the wired media is a significant limitation to the ability of the system to increase bandwidth. UWB technology makes use of the noise floor to transmit data, without interfering with the carrier signal. Moreover, UWB transmitted through a wired medium has distinct advantages over its use in a wireless environment. In a wired environment there are no concerns with intersymbol interference, and there are no concerns relating to multi-user interference.

For example, CATV channels typically occupy 6 MHz in the US and 8 MHz in Europe. These channels are arranged in a re-occurring pattern beginning at approximately 50 MHz and dependent on the CATV system, extend upward to 550 MHz, 750 MHz, 870 MHz, 1 GHz and higher. The present invention is capable of injecting UWB pulses into the existing CATV infrastructure. These UWB signals do not interfere or degrade existing frequency domain signals. Additionally, the UWB signals can carry vast amounts of information with digital meaning in the time domain.

Figure 3:
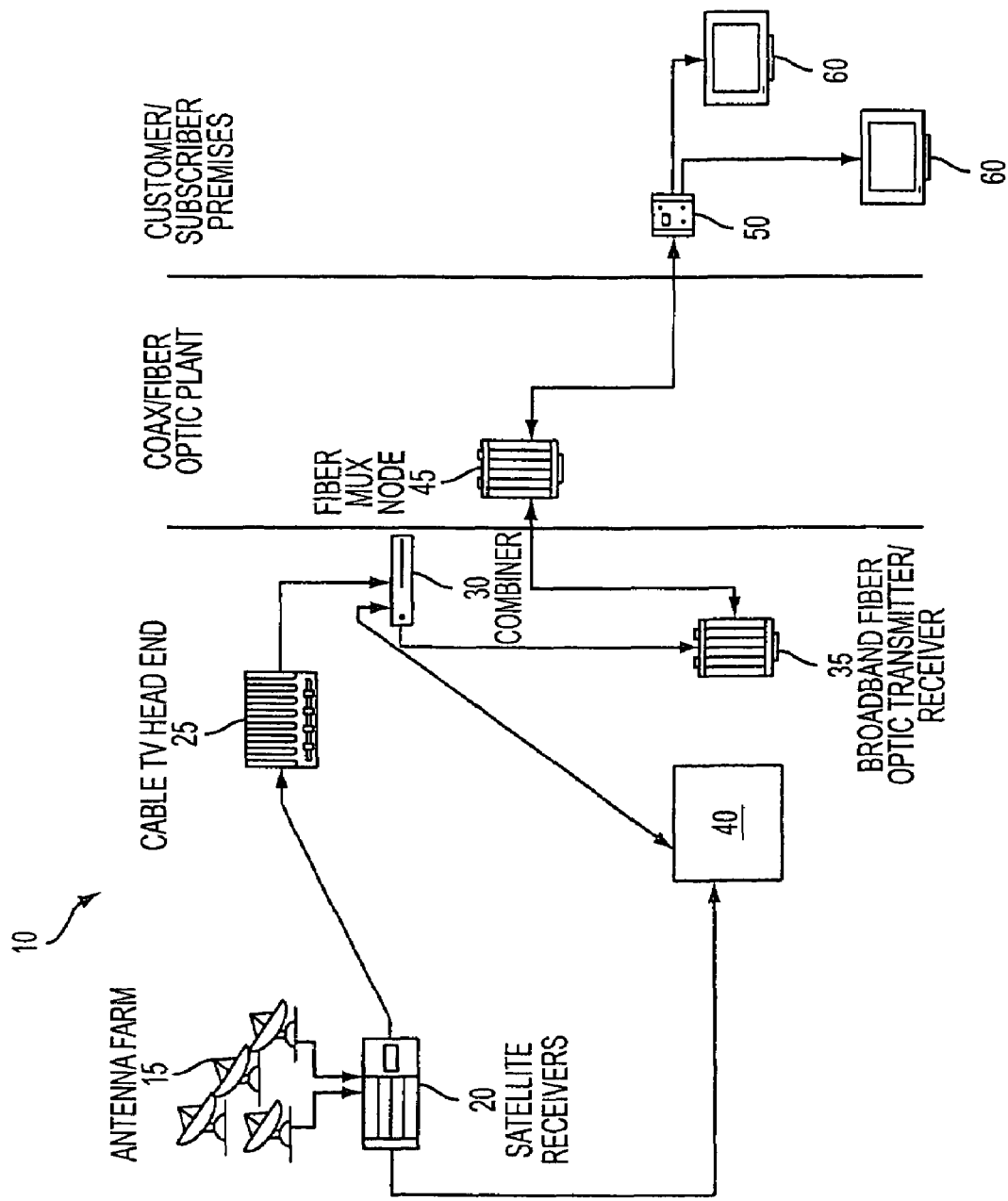
FIG. 3 is a schematic illustration of one embodiment of an ultra-wideband communication system employing a wired medium.
Figure 4:
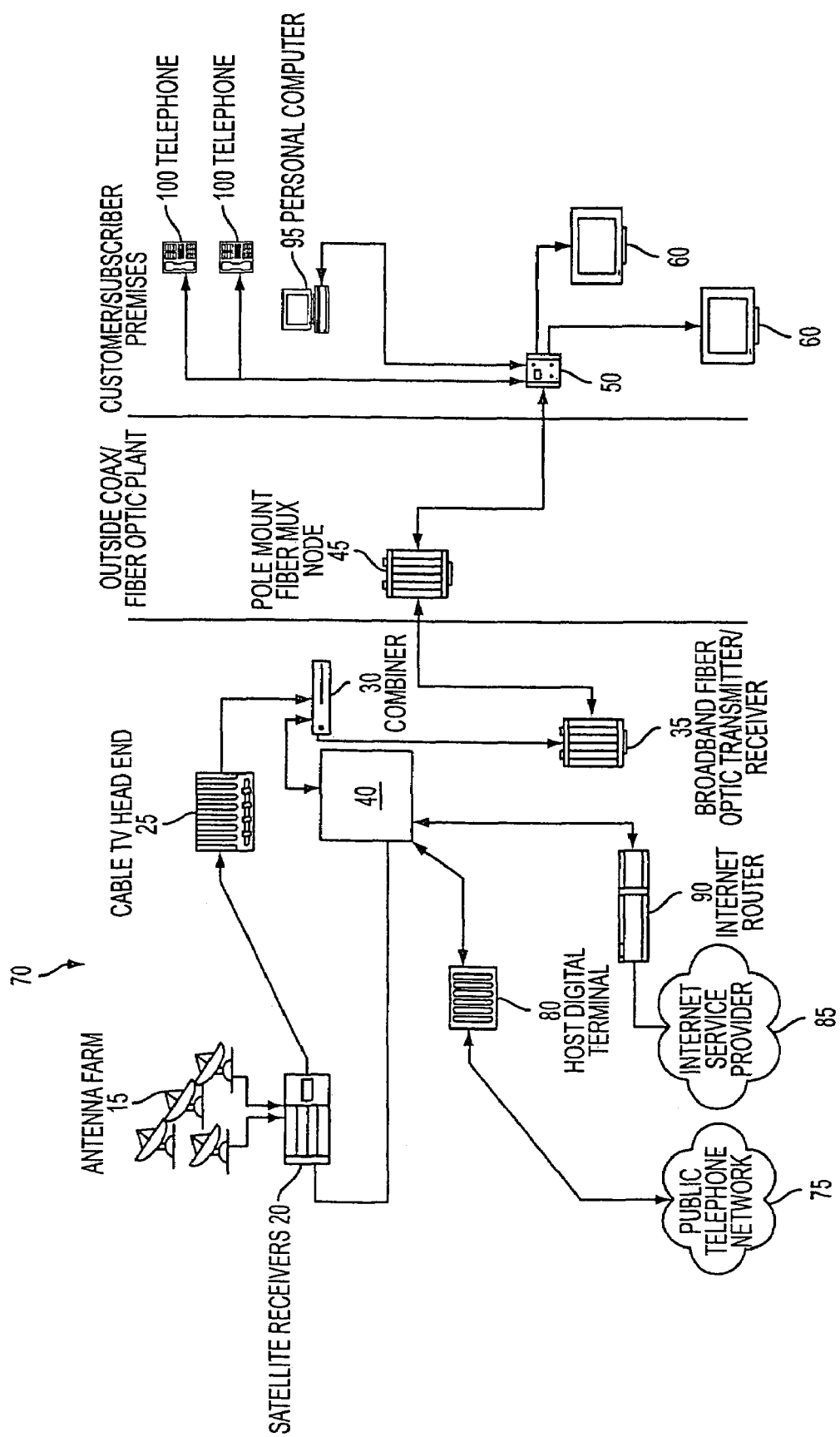
FIG. 4 is a schematic illustration of a second embodiment of an ultra-wideband communication system employing a wired medium.

The present invention provides an apparatus and method to enable any wired media network to augment their available bandwidth. Preferably, this additional bandwidth is obtained by introducing UWB signals into the existing data transmission chain prior to broadcast from the system operator's head-end. As shown in FIGS. 3 and 4, the head-end may include several components, such as the antenna farm 15, the satellite receivers 20, the channel modulator 25, the combiner 30, and the fiber optic transmitter/receiver 35. Alternatively, UWB signals may be introduced into the wired media network at other locations, such as at the Internet router 90 or at the host digital terminal 80, or at any other suitable location.

In like fashion, cable system operators can receive more data from individual subscribers by introducing subscriber-generated data into existing upstream channels. The present invention provides UWB communication across fiber optic and coaxial cable, twisted pair wires, or any other type of conductive wire. A wired media network will be able to both transmit and receive digital information for the purposes of telephony, high-speed data, video distribution, video conferencing, wireless base operations and other similar purposes.

Referring to FIG. 3, the wired ultra-wideband communication system 10 is configured to transmit ultra-wideband signals over an existing network or system that includes wired media. For example, the wired ultra-wideband (UWB) system 10 may transmit UWB signals over an existing community access television network (CATV), an optical network, a cable television network, a community antenna television network, a hybrid fiber-coax television network, an Internet service provider network, a PSTN network, a WAN, LAN, MAN, TCP/IP network, a college campus, town, city, or any other type of network as defined above, that employs wired media, in whole or in part.

One embodiment of the wired UWB communication system 10 is illustrated in FIG. 3. An antenna farm 15 receives audio, video and data information from one or more satellites (not shown). Additional data may be received by terrestrial cables and wires, and by terrestrial wireless sources, such as a multichannel multipoint distribution service (MMDS). The data is then forwarded to the satellite receivers 20 that demodulate the data into separate audio, video and data streams. This information is forwarded to the channel modulators 25 that receive the program signals, such as CNN or MTV. The channel modulators 25 mix each signal with a radio frequency (RF) and assign a station number (such as 2 to 99) that each program will be received on by subscribers.

The multiple RF signals are then forwarded to a combiner 30 that combines the multiple signals into a single output. That is, the combiner 30 receives the program signals from the channel modulators 25 and combines them onto a single coax cable and forwards the signal to the fiber optic transmitter/receiver 35. The above-described arrangement and function of channel modulators 25 and combiners 30 may vary with each type of wired media network.

Additional audio, video, or other data signals received from either the antenna farm 15 or from terrestrial sources such as fiber optic or coaxial cables can be routed from the satellite receiver 20 to the service provider ultra-wideband (UWB) device 40. The service provider UWB device 40 converts the audio, video, or other data signals received from the satellite receiver 20 into a multiplicity of UWB electromagnetic pulses. The service provider ultra-wideband (UWB) device 40 may include several components, including a controller, digital signal processor, an analog coder/decoder, one or more devices for data access management, and associated cabling and electronics. The service provider ultra-wideband (UWB) device 40 may include some, or all of these components, other necessary components, or their equivalents. The controller may include error control, and data compression functions. The analog coder/decoder may include an analog to digital conversion function and vice versa. The data access management device or devices may include various interface functions for interfacing to wired media such as phone lines and coaxial cables.

The digital signal processor in the service provider ultra-wideband (UWB) device 40 modulates the audio, video, or other data signals received from the satellite receiver 20 into a multiplicity of UWB electromagnetic pulses, and may also demodulate UWB pulses received from the subscriber. As defined herein, modulation is the specific technique used to encode the audio, video, or other data into a multiplicity of UWB pulses. For example, the digital signal processor may modulate the received audio, video, or other data signals into a multiplicity of UWB pulses that may have a duration that may range between about 0.1 nanoseconds to about 100 nanoseconds, and may be transmitted at relatively low power, for example, at less than −30 power decibels to −60 power decibels, as measured across the transmitted frequency.

The UWB pulse duration and transmitted power may vary, depending on several factors. Different modulation techniques employ different UWB pulse timing, durations and power levels. The present invention envisions several different techniques and methods to transmit an UWB signal across a wired medium. One embodiment, may for example, use pulse position modulation that varies the timing of the transmission of the UWB pulses. One example of a pulse position modulation system may transmit approximately 10,000 pulses per second. This system may transmit groups of pulses 100 picoseconds early or 100 picoseconds late to signify a specific digital bit, such as a "0" or a "1". In this fashion a large amount of data may be transmitted across a wired medium. Alternatively, the UWB signal may be transmitted in a fashion similar to that described in U.S. patent application entitled, "ENCODING AND DECODING ULTRA-WIDE-BAND INFORMATION," Ser. No. 09/802,590 (in the name of John H. Santhoff and Rodolfo T. Arrieta), which is referred to and incorporated herein in its entirety by this reference.

An alternative modulation technique may use pulse amplitude modulation to transmit the UWB signal across a wired medium. Pulse amplitude modulation employs pulses of different amplitude to transmit data. Pulses of different amplitude may be assigned different digital representations of "0" or "1." Other envisioned modulation techniques include On-Off Keying that encodes data bits as pulse (1) or no pulse (0), and Binary Phase-Shift Keying (BPSK), or bi-phase modulation. BPSK modulates the phase of the signal (0 degrees or 180 degrees), instead of modulating the position. Spectral Keying, which is neither a PPM nor PAM modulation technique may also be employed. It will be appreciated that other modulation techniques, currently existing or yet to be conceived, may also be employed.

A preferred modulation technique will optimize signal coexistence and pulse reliability by controlling transmission power, pulse envelope shape and Pulse Recurrent Frequencies (PRF). Both pseudo-random and fixed PRFs may be used, with the knowledge that a fixed PRF may create a "carrier-like frequency," which it and its higher order harmonics may interfere with the data carried in conventional RF carrier channels. However, with a pseudo-random PRF the difficulties encountered with a fixed PRF are usually avoided. One embodiment of a pseudo-random PRF modulation technique may include a UWB pulse envelope that is shaped to pre-amplify and compensate for high frequency components that the wired media may naturally attenuate. UWB pulse envelope shaping has the additional advantage of controlling the power spectral density of the transmitted data stream.

Several advantages exist when transmitting UWB pulses through wired media as opposed to transmitting UWB pulses through a wireless medium. Wireless UWB transmissions must consider such issues as Inter-Symbol Interference (ISI) and Multi-User Interference (MUI), both of which can severely limit the bandwidth of UWB transmissions. Some modulation techniques such as Pulse Amplitude Modulation (PAM), which offer the ability for high bit densities are not effective at long wireless distances. These, and other issues, do not apply to UWB pulses transmitted over wired media. In addition, no multipath issues arise and there are no propagation delay problems present in a wired medium. Therefore, it is estimated that an ultra-wideband system may be able to transmit data across a wired medium in a range from 100 Mbit/second to 1 Gbit/second. This data rate will ensure that the bandwidth requirements of any service provider can be met.

A preferred embodiment of the service-provider UWB device 40 will spread the signal energy of the UWB data stream across the a bandwidth that may ranger from 50 MHz to approximately 870 MHz or as discussed above, to 1 GHz, or higher. This will ensure that the signal energy present at any frequency is significantly below the normal noise floor for that frequency band, further ensuring coexistence with conventional RF carrier data.

For example, a UWB pulse would have a duration of about 1 nano-second in a UWB data stream that has a 1 GHz bandwidth. Alternatively, the UWB pulse duration would be tailored to match the available frequency of the specific network. For a CATV or HFCS network located in the United States, an ideal UWB pulse would generally be about 0.5 to 2 nano-seconds in duration. This is because a conventional CATV or HFCS network located in the United States typically utilizes a maximum frequency of approximately 870 MHz, but has the capacity to utilize up to 1 GHz. This bandwidth allows for a 1 to 2 nano-second pulse duration. A narrow pulse width is preferred because more pulses can be transmitted in a discrete amount of time. Pulse widths of up to 2 nano-seconds may be employed to guarantee pulse integrity throughout digitization, transmission, reception and reformation at the UWB subscriber device 50. Generally, an idealized pulse width would be calculated based on the frequency response of the specific wired media system.

Referring to FIG. 3, the multiplicity of generated UWB pulses are sent from the service-provider UWB device 40 to the combiner 30, which combines the UWB pulses with the conventional RF carrier signals. One method to accomplish this task is to couple a wire carrying the conventional RF carrier signals to a standard coaxial splitter. A second wire carrying the UWB pulses is also coupled to the standard coaxial splitter. The combined signals are forwarded to the fiber optic transmitter/receiver 35. The fiber optic transmitter/receiver 35 converts both the multiplicity of UWB pulses and the conventional RF carrier signals received from the combiner 30 into a corresponding optical signal. The optical signal generator can be either a light-emitting diode, solid state laser diode, or other suitable device. The optical signal is then distributed on fiber optic cables to residential neighborhoods, business districts, universities, colleges or other locations for distribution to subscribers and customers. Other methods and techniques for combining a UWB pulse stream and a conventional RF carrier signal stream may also be employed. For example, the UWB pulse stream my be sent directly to the fiber optic transmitter/receiver 35, which will then combine the two signals.

Shown in FIG. 3, a fiber multiplexer node 45 may be located at any one of the locations described above. The optical signals are received by the multiplexer 45 and are converted back to the combined conventional RF carrier and UWB pulsed signals. The combined signals are forwarded to a subscriber UWB device 50. The subscriber UWB device 50 can be considered a gateway or router that provides access to the combined signals.

One embodiment of the subscriber UWB device 50 will demodulate the multiplicity of UWB electromagnetic pulses back into a conventional RF carrier signal. The subscriber UWB device 50 may include all, some or additional components found in the service provider UWB device 40. In this manner, additional bandwidth will be available to the wired media network to provide the additional data and functionality demanded by the customer.

An alternative embodiment of the present invention is illustrated in FIG. 4. A full service wired UWB communication system 70 is structured to allow for extremely high data rate transmission of video, telephone, internet and audio signals.

The full service UWB system 70 receives audio, video and data information from an antenna farm 15 or from terrestrial sources such as fiber optic or coaxial cables. These signals are forwarded to the satellite receivers 20 as described above with reference to the wired UWB communication system 10. In addition, signals from a public telephone network 75 are received by a host digital terminal 80. The host digital terminal 80 modulates multiple voice signals into two-way upstream and downstream RF signals. The voice signals from the host digital terminal 80 are forwarded to the service provider UWB device 40.

An internet service provider 85 forwards internet data to the internet router 90. The internet router 90 generates packets, such as TCP/IP packets, which are forwarded to the service provider UWB device 40.

The service provider UWB device 40 modulates the internet data, the telephony data and the data received from the satellite receivers 20 into a multiplicity of electromagnetic pulses, as described above, and forwards the pulses to the combiner 30. The combiner combines the UWB pulses with the conventional RF carrier signals and forwards the combined signal to the fiber optic transmitter/receiver 35. The signals are then converted into an optical signal by either a light emitting diode, solid state laser diode, or other suitable device. The optical signal is then distributed to the fiber multiplexer node 45 located within business districts, residential neighborhoods, universities, colleges and other areas.

The fiber multiplexer node 45 receives the fiber optic signal and converts them back to the combined conventional RF carrier and UWB pulsed signals. The combined signals are forwarded to a subscriber UWB device 50. The subscriber UWB device 50 can be considered a gateway or router that provides access to the combined signals. The subscriber UWB device 50 demodulates the multiplicity of UWB electromagnetic pulses into RF signals and forwards the RF signals to appropriate locations such as televisions, personal computers or telephones. Alternative embodiment subscriber UWB devices 50 may be located adjacent to televisions sets similar to a set-top box and used to transmit on-demand movies, internet access or pay-per-view programs. Yet another embodiment of the present invention may include a UWB device 50 that may be located within a television set, or computer. The UWB device 50 is constructed to convert and distribute data to computers, network servers, digital or subscription televisions, interactive media devices such as set-top boxes and telephone switching equipment.

The subscriber UWB device 50 may also be configured to transmit UWB pulses wirelessly to provide audio, video, and other data content to personal computers, televisions, PDAs, telephones and other devices. For example, UWB device 50 may include the necessary components to transmit and receive UWB or conventional RF carrier signals to provide access to interfaces such as PCI, PCMCIA, USB, Ethernet, IEEE1394, or other interface standards.

The present invention will also allow for data to be transmitted "upstream" toward the service provider. For example, a conventional CATV or HFCS network reserves frequencies below 50 MHz for upstream traffic. One embodiment of the present invention may include a band-pass filter with stopbands above 1 GHz, and below 50 MHz to ensure attenuation of UWB pulses so as not to interfere with upstream traffic. These filters also serve the purpose of limiting potential intermodulation distortion that could be introduced by the UWB pulses.

Alternative embodiments of the present invention may transmits UWB pulses through traditional telephone wires. Depending upon the provider, whether they be a local or long distance carrier, an UWB transmitter/receiver can be located in a regional center, sectional center, primary center, toll center, end-office, or their equivalents.

The present invention of transmitting ultra-wideband signals across a wired medium can employ any type of wired media. For example, the wired media can include optical fiber ribbon, fiber optic cable, single mode fiber optic cable, multimode fiber optic cable, plenum wire, PVC wire, and coaxial cable.

In addition, the wired media can include twisted-pair wiring, whether shielded or unshielded. Twisted-pair wire may consist of "pairs" of color-coded wires. Common sizes of twisted-pair wire are 2 pair, 3 pair, 4 pair, 25 pair, 50 pair and 100 pair. Twisted-pair wire is commonly used for telephone and computer networks. It comes in ratings ranging from category 1 to category 7. Twisted-pair wiring also is available unshielded. That is, the wiring does not have a foil or other type of wrapping around the group of conductors within the jacket. This type of wiring is most commonly used for wiring for voice and data networks. The foregoing list of wired media is meant to be exemplary, and not exclusive.

As described above, the present invention can provide additional bandwidth to enable the transmission of large amounts of data over an existing wired media network, whether the wired media network is a Internet service provider, cable television provider, or a computer network located in a business or university. The additional bandwidth can allow consumers to receive the high speed Internet access, interactive video and other features that they are demanding.

Referring now to FIGS. 5-12, a variety of methods employed to optimize communication through any wire media are illustrated.

The present invention provides a number of methods for improving ultra-wideband (UWB) communication through wire media. As discussed above, there exist several different types of wire media, ranging from optical fiber ribbon, fiber optic cable, single-mode fiber optic cable, multi-mode fiber optic cable, twisted-pair wire media, unshielded twisted-pair wire media, plenum wire, PVC wire, coaxial cable, and other wire media.

Each of these wire, or cable media may have different bandwidths, or available radio frequency (RF) spectra that can be used to carry communication signals. In addition, the bandwidth of each wire, or cable medium may change due to signal attenuation, environmental conditions, and other factors. Or, specific RF spectra within the medium's bandwidth may contain excessive "noise" or have other undesirable characteristics. In addition, conventional communication signals (i.e., substantially continuous sinusoidal frequencies) using specific radio frequency bands may be present within the wire medium.

The present invention provides several methods, that may be employed alone, or in combination that address the above issues, and other issues associated with communication through wire or cable media.

In one embodiment of the present invention, a first ultra-wideband (UWB) device transmits a series of UWB pulses, or symbols. A second UWB device receives and evaluates the signals. The second device then provides feedback, or information to the first device on which symbols were best suited to the transmission medium, and/or to the existing communication environment. The first device then adjusts communication parameters based on the received feedback.

One feature of the present invention is that the feedback process may be performed periodically to optimize communication between the UWB devices.

As discussed above, the present invention employs ultra-wideband (UWB) communication technology, which comprises extremely short duration electromagnetic pulses. As shown in FIG. 2, as the duration of a UWB pulse decreases, the amount of radio frequency (RF) spectrum that it occupies increases. Thus, a UWB communication system constructed according to the present invention can tailor the duration of the UWB pulses to occupy any desired amount of RF spectrum.

One feature of the present invention is that the UWB pulse width, or duration may be tailored to the total available bandwidth of the wire, or cable media, or tailored to a portion of the available bandwidth of the wire, or cable media. For example, a shielded coaxial cable is generally capable of supporting up to about one (1) gigahertz of bandwidth. Therefore, a one-nanosecond UWB pulse width may be appropriate. In twisted-pair wire media, the bandwidth supported is dependent on a number of variables, such as the number of turns per foot (or meter), the gauge of wire used, and whether the twisted-pair wire is shielded or unshielded. In a twisted-pair wire medium supporting a 50 megahertz (MHz) bandwidth, a UWB pulse duration of about 20-nanoseconds may be appropriate.

The communication environment within the media can also affect the available bandwidth. For example, in the North American cable television system, the radio frequency spectrum from zero hertz (i.e., DC) up to about 50 MHz is reserved for "upstream" traffic. Studies of this environment have shown that the lowest 10 MHz (from DC to 10 MHz) of this spectrum may be unsuitable for most forms of communication due to noise. In this type of communication environment, UWB pulse widths of up to about 30 nano-seconds may be employed. Generally, this pulse width or duration will aid in maintaining pulse integrity throughout digitization, transmission, reception and reformation at the receiver. It will be appreciated that other UWB pulse widths may be employed that can also maintain their integrity.

Similarly, it may be desirable to avoid certain radio frequency (RF) spectra or bands in other wire media. Put differently, it may be advantageous to occupy particular RF bands. For example, the typical frequency response in the AC power line environment includes a number of nulls that may be avoided to ensure optimum communications. In bi-directional communication systems where a specific RF bands used for upstream and downstream communication, it may be advantageous to limit downstream UWB communication to the RF bands designated for downstream traffic, and similarly, limit upstream UWB communication to the RF bands designated for upstream traffic. This allows upstream UWB communication to coexist with downstream UWB communication.

Additionally, there are applications where the employed RF spectrum or band(s) falls short of the theoretical RF spectrum capacity of the wire or cable. In this environment it may be advantageous to employ RF band(s) for UWB communications that to not overlap with the RF band(s) employed by the existing system. In other applications it may be more advantageous to occupy the entire available RF spectrum, because increasing the radio frequency "spread" of the UWB pulses also increases resistance to interference from existing electromagnetic signals.

Other factors may affect communication through wire, or cable media. For example, UWB pulse propagation through wire media may cause a degree of dispersion, broadening, and/or "smearing" of the pulse signal. The amount of distortion and attenuation in the pulse signal is in part dependent on the distance the pulse travels through the media. An ideal pulse width may therefore be calculated based on the frequency response of the wire media, and then iteratively adapted to the environmental conditions of a specific deployed communication system using the media.

Communication through alternating current (AC) power lines presents additional problems. Generally, AC power lines exhibit unpredictable transmission characteristics such as extreme attenuation at certain frequencies, phase changes along the route, notches and discontinuities. In addition, AC power lines may have several different types of "noise." Generally, there are three modes of noise most common on AC power lines: Gaussian noise, low voltage impulsive interference, and very high voltage spikes. Furthermore, the communication environment may vary significantly as electrical load conditions on the line vary, e.g., a variety of other electrical loads may be added or removed from the power line. For example, such electrical loads may include industrial machines, the various electrical motors of numerous appliances, light dimmer circuits, heaters, battery chargers, and a host of other electrical loads. Any number of these electrical loads may be reactive in nature and may affect the voltage and current phase of any UWB pulses, or other signals present on the power line.

The above-described problems and difficulties, and others not described may be encountered when communicating through wire or cable media. One feature of the present invention is that ultra-wideband pulses, or signals are adapted to the characteristics of the wire or cable media itself and to the communication environment present within the wire or cable media.

For example, when sharing a wire medium with other communication technologies, such as conventional sinusoidal waveforms, the UWB pulse, or signal power may be adjusted to avoid interference with the other signals. Also, the distribution of the UWB pulse power may be adjusted to avoid interference with the other signals. By randomizing the periodicity at which UWB pulses are sent, the pulse power in a UWB signal can be relatively evenly distributed throughout the bandwidth occupied by the UWB pulses. Alternatively, a pseudorandom PRF may be employed. By employing a pseudorandom PRF and controlling the power level of UWB pulse transmissions, the power generated by the UWB transmission, at any specific frequency, can be within the noise floor of other communication methods present on the wire media.

Alternatively, when communicating though a wire medium in the absence of any other communication signals, UWB pulse power may be increased without any concern of exceeding the noise floor and/or causing interference. When communicating in this environment, a fixed PRF may be employed. Increased UWB pulse power may also be employed when communicating through coaxial or other shielded cable or wire media where the radiated transmissions from the media are reduced or eliminated by the outer core of the coax or by shielding. When communicating through media other than coax or shielded media, the transmission power may be controlled to reduce radio frequency emissions.

Figure 5:
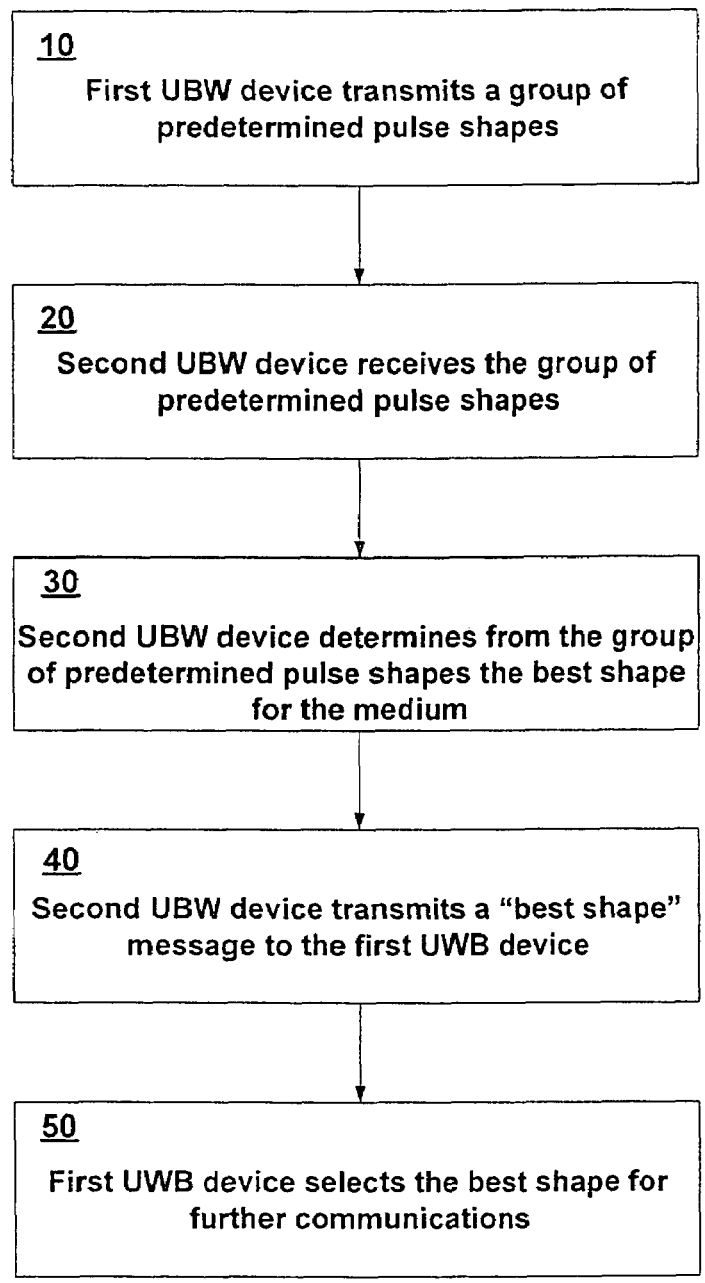
FIG. 5 illustrates a flow chart of one method of optimizing communication through wire media.

Referring now to FIG. 5, one method of optimizing communication through wire or cable media is illustrated. In this example, the power spectral density of an ultra-wideband (UWB) pulse is adjusted to optimize communications. The power spectral density (PSD) of a UWB pulse, or signal is a representation of how the pulses' power is distributed within the radio frequency spectrum. In wire communication environments containing interference, or other difficulties at particular radio frequencies, the PSD of the transmitted UWB pulse, or signal may be shaped to better match the frequency response of the wire media. Alternatively, specific radio frequencies may be avoided where significant signal attenuation may occur. UWB pulse shaping can control the PSD. Generally, pulse shaping may include changes to the duration and radio frequency content of a UWB pulse. For example, a UWB pulse may be filtered to eliminate specific radio frequency bands. Or, a UWB pulse may be amplified to increase specific radio frequency bands. In addition, UWB pulse shaping may include generating substantially triangular shaped pulses, or substantially square shaped pulses. It will be appreciated that other methods of pulse shaping may be employed.

As shown in FIG. 5, a series of predetermined, or known pulse shapes are sent from a first UWB device. A second UWB device evaluates the received pulse shapes and replies to the first device with a message that selects or identifies the best pulse shape for the current conditions of the media. Generally, the best pulse shape is the received pulse shape that most closely resembles its transmitted pulse shape. This process may be iteratively applied to "fine tune" the pulse shape. For example, the best pulse shape may be further modified in an effort to minimize the differences between the transmitted and received pulse shapes. Additionally, this process may be periodically repeated to ensure higher reliability in a changing communication environment.

Referring to FIG. 5, a first UWB device transmits a group or series of predetermined, or known pulse shapes in step 10. A second UWB device receives the group of pulse shapes in step 20. In step 30, the second device determines the best pulse shape from the received pulse shapes. Determination of the best pulse shape by be performed by correlating a template copy of the expected pulse shape with the received pulse shape, or alternatively, this determination may be made on the basis of a received signal strength indicator (RSSI). RSSI, as used herein, is a measure of received power relative to the expected received power. An RSSI may indicate any attenuation of the pulse by the wire or cable media. In step 40, the second UWB device responds to the first UWB device with a message. The message may contain which pulse shape is most appropriate (the "best" shape) for the specific wire medium due to any attenuation and/or other factors encountered during transmission. Additionally, the message may contain information that would allow the first UWB device to pre-distort, pre-emphasize or otherwise alter the selected pulse to better counter the attenuation or other characteristics of the wire or cable media. In step 50, the first UWB device adapts the UWB pulse shape for future communications based on the feedback given by the second UWB device.

Figure 6:
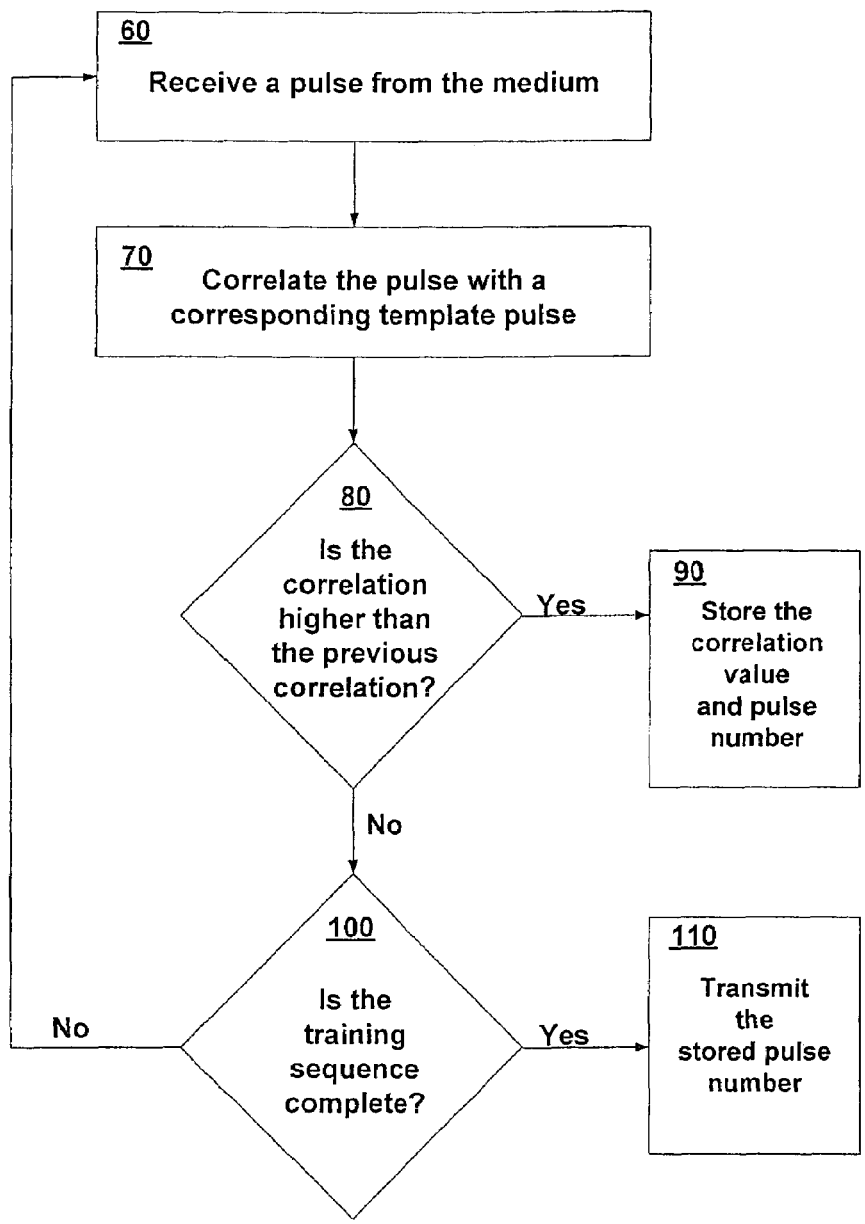
FIG. 6 illustrates a flow chart of another method of optimizing communication through wire media.

Referring to FIG. 6, another method of the present invention is illustrated. In step 60, a UWB device receives a UWB pulse from the wire or cable media. The UWB pulse may be one of several included within a "training set" of UWB pulses. In step 70, the received pulse is correlated with a locally generated template of the expected signal, and a peak, or maximum correlation value is calculated. In step 80, the peak correlation value is compared to the previous maximum correlation value. In step 90, if the present correlation value is higher than the previous maximum value, it is stored for future comparison. In step 100, if the present correlation value is lower than the previous maximum value, and if the entire training set of UWB pulses has not been received, the second UWB device returns to step 60 and awaits the next pulse in the training set.

However, if the present correlation value is greater than the previous maximum value, and/or if the entire training set of UWB pulses has been sent, then in step 110, the second device sends a message containing information relating to the UWB pulse received at the maximum correlation value to the first UWB device. If the entire training set has not been received, the second UWB device returns to step 60 and awaits the next pulse in the training set.

Figure 7:
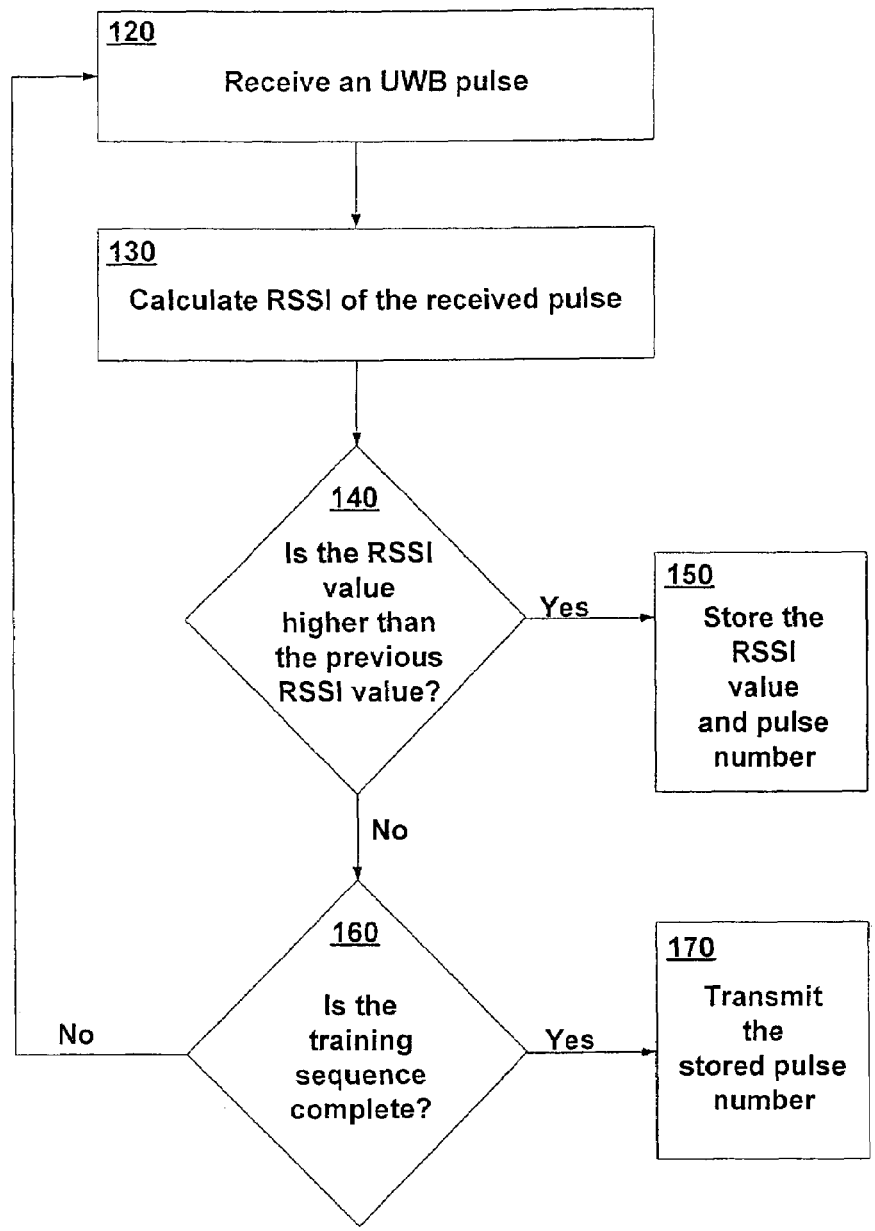
FIG. 7 illustrates a flow chart of yet another method of optimizing communication through wire media.

Referring to FIG. 7, another method of the present invention is illustrated. The method described in this embodiment is similar to the method illustrated in FIG. 6, but the received signal strength indicator (RSSI) is used to determine the optimum UWB pulse configuration. In step 120, the second UWB device receives a pulse from the wire or cable media. In step 130, the RSSI of the received pulse is calculated. In step 140, the RSSI value of the received UWB pulse is compared to the previous maximum RSSI value. In step 150, if the present RSSI value is higher than the previous maximum RSSI value, it is stored for future comparison. In step 160, if the present RSSI value is lower than the previous maximum RSSI value, and if the entire training set of UWB pulses has not been received, the second UWB device returns to step 120 and awaits the next pulse in the training set.

However, if the present RSSI value is greater than the previous maximum value, and/or if the entire training set of UWB pulses has been sent, then in step 170, the second device sends a message containing information relating to the UWB pulse received at the maximum RSSI value to the first UWB device. If the entire training set has not been received, the second UWB device returns to step 120 and awaits the next pulse in the training set.

Figure 8:
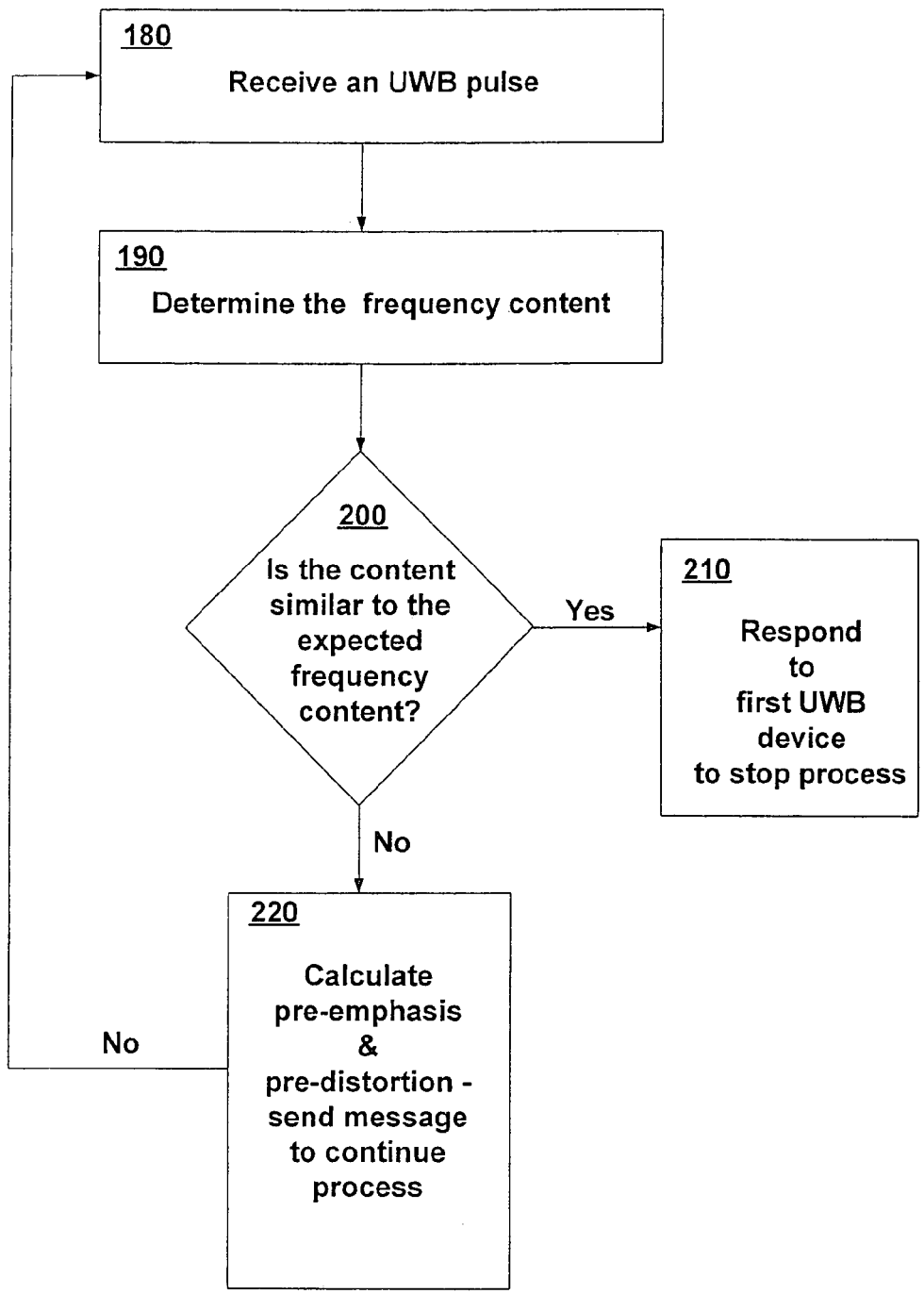
FIG. 8 illustrates a flow chart of yet another method of optimizing communication through wire media.

Referring now to FIG. 8, another method of the present invention is illustrated. In step 180, the device receives an UWB pulse from the wire or cable media. The receiving device calculates the radio frequency content, or spectrum of the received pulse in step 190. In one embodiment, a Fast Fourier Transform (FFT) may accomplish step 190. Since the UWB pulse duration and bandwidth are inversely proportional, this step may also include measuring the received pulse duration. In step 200, the received radio frequency content is compared to the expected radio frequency content. Because UWB communication through wire or cable media may be subject to radio frequency attenuation, step 200 may determine how the received pulse may be pre-distorted, pre-emphasized or otherwise shaped or optimized to accommodate the characteristics, or communication environment of the employed medium. For example, as discussed above, specific radio frequency bands within a wire medium may contain excessive noise, or the medium itself may include discontinuities or other unexpected characteristics that may attenuate portions of the UWB pulse's radio frequency spectrum.

In step 210, if the radio frequency content of the UWB pulse is acceptable to the second UWB device, the second device responds with a message to the first device to stop the iterative process. A determination of what an "acceptable" UWB pulse is may be made based on an amount of the UWB pulse's radio frequency content that is received. If the radio frequency content may be further optimized the second device responds with a message on how the pulse should be pre-distorted or pre-emphasized in step 220. It is anticipated that an optional counter may be employed to stop the iterative process after a fixed number of iterations.

Figure 9:
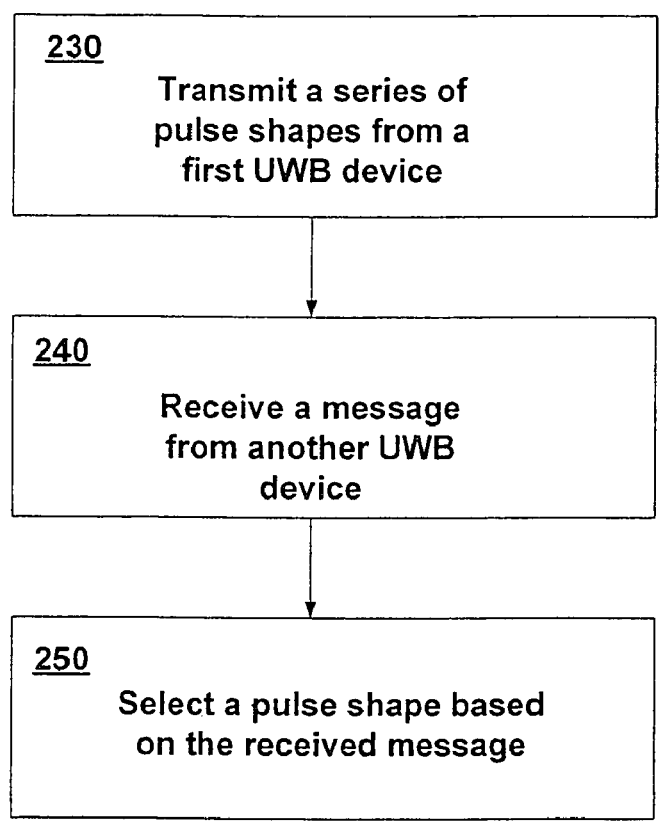
FIG. 9 illustrates a flow chart of yet another method of optimizing communication through wire media.

Referring specifically to FIG. 9, which illustrates one method of optimizing ultra-wideband (UWB) communication through wire or cable media. In step 230, a first UWB device transmits a number of predetermined pulse shapes called a "training set." It is anticipated that this training set may include a number of pulse shapes or may be a single UWB pulse shape. After transmission of the training set the first UWB device waits for a response. In step 240, the first UWB device receives a message from the second UWB device. This message may contain information relating to one or more characteristics of the received pulse. For example, one pulse characteristic may be the received pulse power. In this example, the first UWB device may increase or decrease the transmission power of future UWB pulses. Alternatively, the pulse characteristic may relate to information on which of the pulse shapes were best suited for the media. In step 250, the first UWB device selects the appropriate pulse shape based on the received message.

Figure 10:
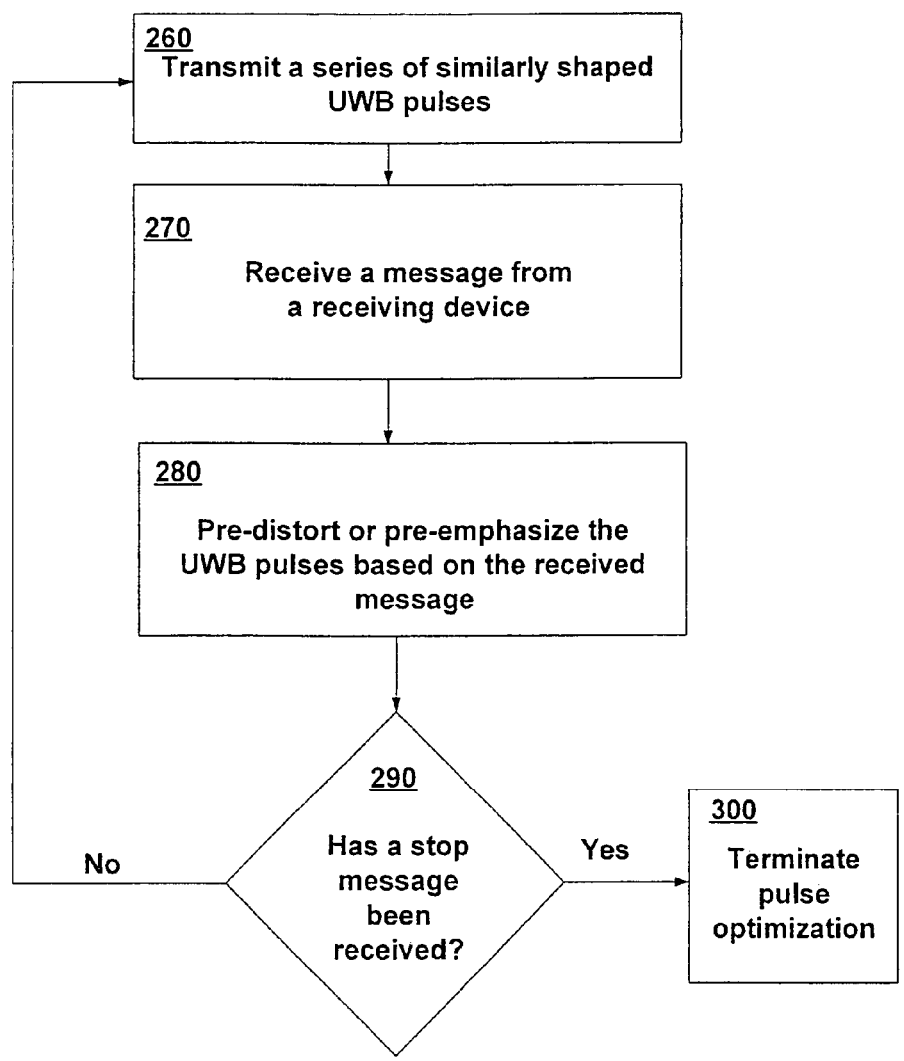
FIG. 10 illustrates a flow chart of yet another method of optimizing communication through wire media.

Referring specifically to FIG. 10, which illustrates another embodiment of the present invention. In step 260, a first UWB device transmits a series, or number of similarly shaped UWB pulses. The series may be limited to a single UWB pulse or may contain a number of UWB pulses. In step 270, the first UWB device receives a message from a second UWB device containing information on how to pre-distort or pre-emphasize selected radio frequency content, or spectra of the UWB pulses. Alternatively, this message may only contain information on how the UWB pulse was received and the first device may then determine how to adapt the pulse accordingly. For example, the transmission power, pulse duration or other pulse characteristics may be altered.

In step 280, the first UWB device modifies, or alters the series of UWB pulses based on the received information, and re-transmits the UWB pulses. In step 290, the first UWB device checks for a stop signal within a message received from the second UWB device. And, in step 300, if the stop message has been received, it terminates the UWB pulse optimization process. If no stop signal is present in the message, the first device returns to step 260 and continues to iterate the optimization process. Alternatively, the iterative process may be executed for a predetermined number of times, or cycles and the first or second device, or both, may count iterations and notify the other of termination after the predetermined number of cycles are executed.

Figure 11:
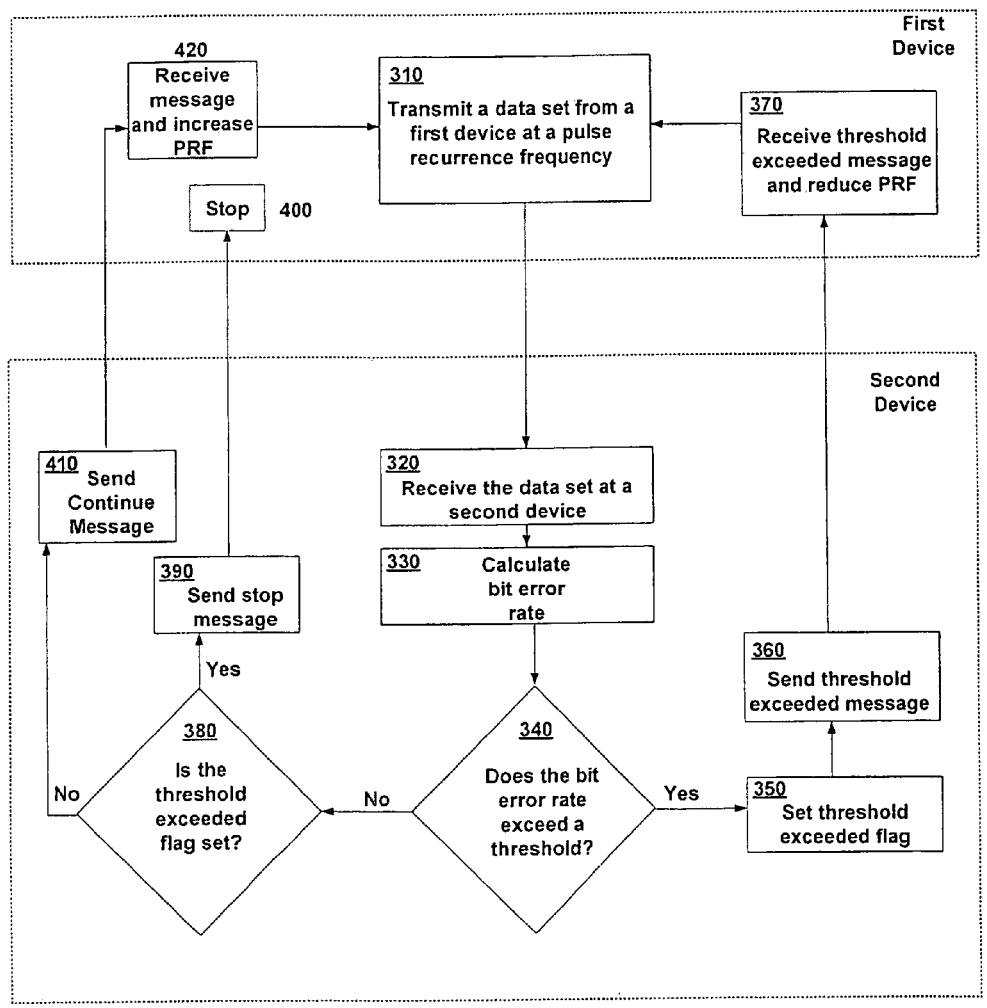
FIG. 11 illustrates a flow chart of yet another method of optimizing communication through wire media.

Referring to FIG. 11, in another embodiment of the present invention, a bit-error-rate (BER) is measured and the UWB pulse recurrence frequency (PRF), or pulse transmission rate is adjusted in response to the BER.

In step 310, a first UWB device transmits a data set through a wire or cable medium. The data set may comprise any number of data bits. In step 320, a second UWB device receives the data set. The second device calculates the BER in step 330, by comparing the data bits that were received with the expected data bits. The calculated BER is compared to a threshold in step 340. If the BER exceeds the threshold, a threshold exceeded flag is set in step 350, and a threshold-exceeded message is sent in step 360. The first UWB device receives the threshold-exceeded message and reduces its PRF in step 370.

If the BER threshold is not exceeded, the second device checks to see if the threshold-exceeded flag is set in step 380. If the threshold-exceeded flag is set, in step 390 the second device sends a stop message to the first device and the first device terminates the process in step 400. If the threshold-exceeded flag is not set, in step 410 the second device sends a continue message. The first device receives the continue message and increases its PRF in step 420.

Figure 12:
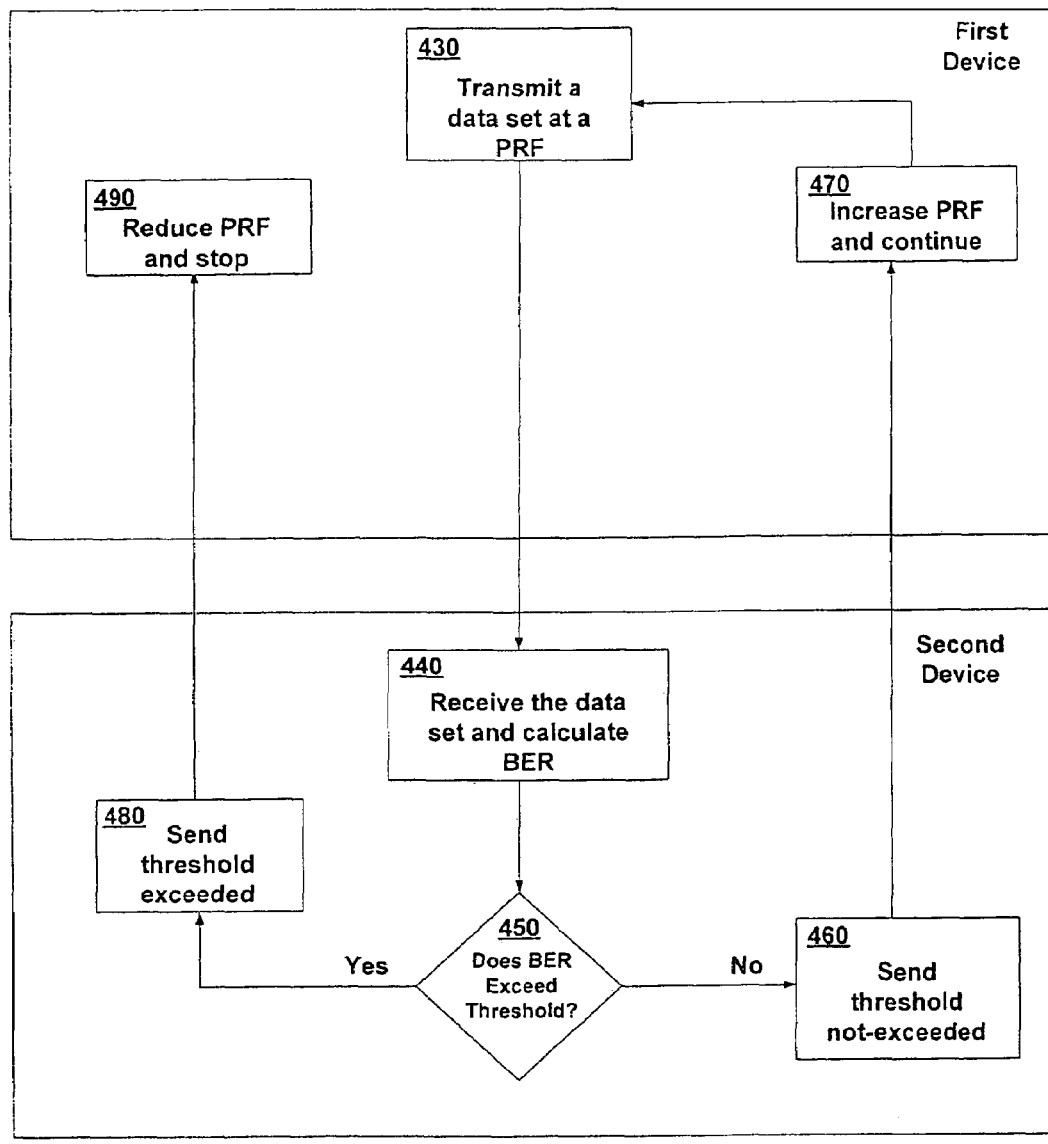
FIG. 12 illustrates a flow chart of yet another method of optimizing communication through wire media.

Alternatively, as illustrated in FIG. 12, a first UWB device transmits a data set through a wire or cable medium in step 430. In step 440, a second device receives the data set from the medium and calculates the BER. In step 450, the calculated BER is compared to a threshold. If the threshold is exceeded, the second device sends a threshold-exceeded message to the first device in step 480. The first device receives the threshold-exceeded message, reduces the PRF and terminates the optimization process in step 490.

In step 460, if the calculated BER is below the threshold BER, the second device sends a threshold not exceeded message. In step 470 the first device receives the threshold not exceeded message, increases the PRF and continues the process.

One feature of the present invention is that the above-described methods may be used in sequence with each other. For example, in one embodiment, the process described in FIG. 5 is followed by the pre-distortion and pre-emphasis process described in FIGS. 8 and 10. It will be appreciated that other combinations of optimization methods may be employed by the present invention.

Since the characteristics of wire or cable media may change with the environmental and load conditions of the media, it is anticipated that the optimization process may be periodically repeated during communication. The periodicity of the optimization process may be additionally dependent on the BER. In one embodiment, a BER calculation is done periodically and if the BER exceeds a pre-determined threshold, one or more of the above-described optimization methods may be employed.

Thus, as discussed above, embodiments of the present invention may include an ultra-wideband communication system for a wire medium, comprising an ultra-wideband transmitter structured to transmit a training set of ultra-wideband pulses through the wire medium and an ultra-wideband receiver structured to receive the training set of ultra-wideband pulses from the wire medium. Each of the ultra-wideband pulses comprising the training set may comprise a pulse of electromagnetic energy having a duration that can range from about 10 picoseconds to about 10 milliseconds. The training set of ultra-wideband pulses may comprise at least one ultra-wideband pulse selected from a group consisting of: a pre-distorted pulse, a pre-emphasized pulse, a shaped pulse, a substantially triangular pulse, a substantially square pulse, a pulse occupying a portion of a radio frequency spectrum, with a segment of the occupied radio frequency spectrum substantially eliminated; and a pulse occupying a portion of a radio frequency spectrum, with a segment of the occupied radio frequency spectrum amplified.

The wire medium may be selected from a group consisting of an optical fiber ribbon, a fiber optic cable, a single mode fiber optic cable, a multi-mode fiber optic cable, a twisted pair wire, an unshielded twisted pair wire, a plenum wire, a PVC wire, a coaxial cable, an electrically conductive material, a power line, an optical network, a cable television network, a community antenna television network, a community access television network, a hybrid fiber coax system network, a public switched telephone network, a wide area network, a local area network, a metropolitan area network, a TCP/IP network, a dial-up network, a switched network, a dedicated network, a nonswitched network, a public network and a private network.

One embodiment of the present invention may include a method of optimizing ultra-wideband communications through a wire medium, where the method may include the steps of transmitting a training set of ultra-wideband pulses through the wire medium, the training set of ultra-wideband pulses comprising at least one ultra-wideband pulse, receiving the training set of ultra-wideband pulses from the wire medium, and determining which of the ultra-wideband pulses in the training set was received in a form that is most similar to a transmitted form.

The step of determining which of the ultra-wideband pulses in the training set was received in the form that is most similar to the transmitted form may be selected from a group of steps selected from: 1) correlating each of the received ultra-wideband pulses with a corresponding pulse template, and determining which of the transmitted ultra-wideband pulses most closely matches its corresponding pulse template; 2) calculating a received signal strength indicator for each of the transmitted ultra-wideband pulses, and selecting the pulse having a highest received signal strength indicator; and 3) determining a radio frequency content for each of the transmitted ultra-wideband pulses, and selecting the pulse having a received radio frequency content that is most similar to a transmitted radio frequency content.

The training set of ultra-wideband pulses may comprise at least one ultra-wideband pulse selected from a group consisting of a pre-distorted pulse, a pre-emphasized pulse, a shaped pulse, a substantially triangular pulse, a substantially square pulse, a pulse occupying a portion of a radio frequency spectrum, with a segment of the occupied radio frequency spectrum substantially eliminated, and a pulse occupying a portion of a radio frequency spectrum, with a segment of the occupied radio frequency spectrum amplified.

Another embodiment of the present invention may include a method of optimizing ultra-wideband communications through a wire medium, where the method may include the steps of transmitting a data set of ultra-wideband pulses through the wire medium, the data set of ultra-wideband pulses comprising a group of bits, and receiving the data set of ultra-wideband pulses from the wire medium, and determining a data set bit-error-rate. The method may also include the step of adjusting an ultra-wideband pulse recurrence frequency relative to the data set bit-error-rate, where the data set bit-error-rate may comprise a percentage of bits that have an error relative to a total number of received bits.

The method may also include a step selected from a group consisting of: 1) correlating each of the received ultra-wideband pulses with a corresponding pulse template, and determining which of the transmitted ultra-wideband pulses most closely matches its corresponding pulse template; 2) calculating a received signal strength indicator for each of the transmitted ultra-wideband pulses, and selecting the pulse having a highest received signal strength indicator; and 3) determining a radio frequency content for each of the transmitted ultra-wideband pulses, and selecting the pulse having a received radio frequency content that is most similar to a transmitted radio frequency content.

Thus, it is seen that methods for optimizing ultra-wideband communication through wire or cable media are provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents for the particular embodiments discussed in this description may practice the invention as well.

What is claimed is:

1. An ultra-wideband communication system for a wire medium, comprising:
    an ultra-wideband transmitter structured to transmit a set of predetermined ultra-wideband pulses through the wire medium, with each of the ultra-wideband pulses having a different power spectral density; and
    an ultra-wideband receiver structured to receive the set of predetermined ultra-wideband pulses from the wire medium and the ultra-wideband receiver then responds to the ultra-wideband transmitter which ultra-wideband pulse of the set was received having a power spectral density closest to its transmitted power spectral density.

2. The ultra-wideband communication system of claim 1, wherein each of the predetermined ultra-wideband pulses comprises a pulse of electromagnetic energy having a duration that range from about 10 picoseconds to about 10 milliseconds.

3. The ultra-wideband communication system of claim 1, wherein the predetermined ultra-wideband pulses comprises at least one ultra-wideband pulse selected from a group consisting of: a pre-distorted pulse, a pre-emphasized pulse, a shaped pulse, a substantially triangular pulse, a substantially square pulse, a pulse occupying a portion of a radio frequency spectrum, with a segment of the occupied radio frequency spectrum substantially eliminated; and a pulse occupying a portion of a radio frequency spectrum, with a segment of the occupied radio frequency spectrum amplified.

4. The ultra-wideband communication system of claim 1, wherein the wire medium is selected from a group consisting of: an optical fiber ribbon, a fiber optic cable, a single mode fiber optic cable, a multi-mode fiber optic cable, a twisted pair wire, an unshielded twisted pair wire, a plenum wire, a PVC wire, a coaxial cable, and an electrically conductive material.

5. The ultra-wideband communication system of claim 1, wherein the wire medium is selected from a group consisting of: a power line, an optical network, a cable television network, a community antenna television network, a community access television network, a hybrid fiber coax system network, a public switched telephone network, a wide area network, a local area network, a metropolitan area network, a TCP/IP network, a dial-up network, a switched network, a dedicated network, a nonswitched network, a public network and a private network.

6. A method of optimizing ultra-wideband communications through a wire medium, the method comprising the steps of:
    transmitting a set of predetermined ultra-wideband pulses through the wire medium, with each of the ultra-wideband pulses having a different power spectral density;
    receiving the set of predetermined ultra-wideband pulses from the wire medium; and
    determining which of the predetermined ultra-wideband pulses was received in a form that is most similar to a transmitted form.

7. The method of claim 6, wherein the step of determining which of the predetermined ultra-wideband pulses was received in the form that is most similar to the transmitted form is selected from a group of steps selected from:
    correlating each of the received ultra-wideband pulses with a corresponding pulse template, and determining which of the transmitted predetermined ultra-wideband pulses most closely matches its corresponding pulse template;

calculating a received signal strength indicator for each of the transmitted ultra-wideband pulses, and selecting the pulse having a highest received signal strength indicator; and determining a radio frequency content for each of the transmitted ultra-wideband pulses, and selecting the pulse having a received radio frequency content that is most similar to a transmitted radio frequency content.

8. The method of claim 6, wherein the wire medium is selected from a group consisting of: a power line, an optical network, a cable television network, a community antenna television network, a community access television network, and a hybrid fiber coax system.

9. The method of claim 6, wherein the wire medium is selected from a group consisting of: an optical fiber ribbon, a fiber optic cable, a single mode fiber optic cable, a multi-mode fiber optic cable, a twisted pair wire, an unshielded twisted pair wire, a plenum wire, a PVC wire, a coaxial cable, and an electrically conductive material.

10. The method of claim 6, wherein the at least one ultra-wideband pulse comprises a pulse of electromagnetic energy having a duration that range from about 10 picoseconds to about 10 milliseconds.

11. The method of claim 6, wherein the set of predetermined ultra-wideband pulses comprises at least one ultra-wideband pulse selected from a group consisting of: a pre-distorted pulse, a pre-emphasized pulse, a shaped pulse, a substantially triangular pulse, a substantially square pulse, a pulse occupying a portion of a radio frequency spectrum, with a segment of the occupied radio frequency spectrum substantially eliminated; and a pulse occupying a portion of a radio frequency spectrum, with a segment of the occupied radio frequency spectrum amplified.

12. A method of optimizing ultra-wideband communications through a wire medium, the method comprising the steps of:

transmitting a set of ultra-wideband pulses through the wire medium, with each of the ultra-wideband pulses in the set having a different power spectral density;

receiving the set of ultra-wideband pulses from the wire medium; and determining a radio frequency content for each of the transmitted ultra-wideband pulses, and selecting the pulse having a radio frequency content that is most similar to a transmitted radio frequency content.

13. The method of claim 12, further including the step of adjusting an ultra-wideband pulse recurrence frequency relative to a bit-error-rate.

14. The method of claim 13, wherein the bit-error-rate comprises a percentage of bits that have an error relative to a total number of received bits.

15. The method of claim 12, wherein the wire medium is selected from a group consisting of: an optical fiber ribbon, a fiber optic cable, a single mode fiber optic cable, a multi-mode fiber optic cable, a twisted pair wire, an unshielded twisted pair wire, a plenum wire, a PVC wire, a coaxial cable, and an electrically conductive material.

16. The method of claim 12, wherein the wire medium is selected from a group consisting of: a power line, an optical network, a cable television network, a community antenna television network, a community access television network, a hybrid fiber coax system network, a public switched telephone network, a wide area network, a local area network, a metropolitan area network, a TCP/IP network, a dial-up network, a switched network, a dedicated network, a non-switched network, a public network and a private network.

17. The method of claim 12, wherein each of the ultra-wideband pulses comprises a pulse of electromagnetic energy having a duration that range from about 10 picoseconds to about 10 milliseconds.

18. The method of claim 12, wherein each of the ultra-wideband pulses comprises a pulse of electromagnetic energy having a duration that range from about 10 picoseconds to about 10 milliseconds and a power that can range from about +30 power decibels to about −60 power decibels, as measured at a single frequency.

* * * * *